United States Patent [19]
Bloomberg et al.

[11] Patent Number: 5,689,585
[45] Date of Patent: Nov. 18, 1997

[54] METHOD FOR ALIGNING A TEXT IMAGE TO A TRANSCRIPTION OF THE IMAGE

[75] Inventors: Dan S. Bloomberg; Leslie T. Niles, both of Palo Alto; Gary E. Kopec, Belmont; Philip Andrew Chou, Menlo Park, all of Calif.

[73] Assignee: Xerox Corporation, Stamford, Conn.

[21] Appl. No.: 431,004

[22] Filed: Apr. 28, 1995

[51] Int. Cl.$^6$ .................................................. G06K 9/72
[52] U.S. Cl. .................................... 382/229; 395/761
[58] Field of Search ............................... 382/229, 224; 364/419.13, 419.1

[56] References Cited

U.S. PATENT DOCUMENTS

| | | | |
|---|---|---|---|
| 4,905,287 | 2/1990 | Segawa | 395/2.63 |
| 5,321,770 | 6/1994 | Huttenlocher et al. | 382/229 |
| 5,333,275 | 7/1994 | Wheatley et al. | 395/2.52 |
| 5,438,512 | 8/1995 | Mantha et al. | 364/419.1 |
| 5,438,628 | 8/1995 | Spitz et al. | 382/229 |
| 5,438,630 | 8/1995 | Chen et al. | 382/159 |
| 5,455,871 | 10/1995 | Bloomberg et al. | 382/173 |
| 5,473,705 | 12/1995 | Abe et al. | 382/229 |
| 5,513,304 | 4/1996 | Spitz et al. | 382/295 |
| 5,524,066 | 6/1996 | Kaplan et al. | 382/229 |
| 5,526,444 | 6/1996 | Kopec et al. | 382/233 |
| 5,544,050 | 8/1996 | Abe et al. | 364/419.13 |

OTHER PUBLICATIONS

Hull, "A Hidden Markov Model for Language Syntax in Text Recognition", Pattern Recognition, '92 11th Int'l. vol. 11, pp. 124–127.

G. Nagy, et al in "A prototype document image analysis system for technical journals", *IEEE Computer,* Jul., 1992, pp. 10–22.

A. Dengel, et al. in "From Paper to Office Document Standard Representation" *Computer,* vol. 25, No. 7, Jul. 1992, pp. 63–67.

T. Butler, "Retaining Document Format in OCR," in *SPIE vol. 2181 Document Recognition, Proceedings of the IS&T/ SPIE Electronic Imaging Conference,* San Jose, CA, Feb. 1994, pp. 78–86.

Huang, Ariki and Jack, *Hidden Markov Models for Speech Recognition,* Edinburgh University Press, 1990, Chapter 3, Section 3.2, at pp. 70–81.

Rabiner, Lawrence and Juang, Biing-Hwang, *Fundamentals of Speech Recognition,* Prentice Hall, 1993, Chapter 4, Sec. 4.7, at pp. 200–241, Chapter 6, Sec. 6.4.1 at pp. 334–340.

*Primary Examiner*—Joseph Mancuso
*Assistant Examiner*—Anthony H. Kahng
*Attorney, Agent, or Firm*—Judith C. Bares

[57] ABSTRACT

A method for establishing a relationship between a text image and a transcription associated with the text image uses conventional image processing techniques to identify one or more geometric attributes, or image parameters, of each of a sequence of regions of the text image. The transcription labels in the transcription are analyzed to determine a comparable set of parameters in transcription label sequence. A matching operation then matches the respective parameters of the two sequences to identify image regions that match with transcription regions. The result is an output data structure that minimally identifies image locations of interest to a subsequent operation that processes the text image. The output data structure may also pair each of the image locations of interest to a transcription location, in effect producing a set of labeled image locations. In one embodiment, the sequence of locations of words and their observed lengths in the text image are determined. The transcription is analyzed to identify words, and transcription word lengths are computed using an estimated image character width of glyphs in the text image. The sequence of observed image word lengths is then matched to the sequence of computed transcription word lengths using a dynamic programming algorithm that finds a best path through a two-dimensional lattice of nodes and transitions between nodes, where the transitions represent pairs of sequences of zero or more word lengths. An output data structure contains entries, each of which pairs a transcription word with a matching image word location.

15 Claims, 9 Drawing Sheets

| Image Word Parameters: | | | |
|---|---|---|---|
| estimated avg. glyph width, pixels | estimated average image inter-word spacing, pixels | other image word parameters... | ... |

| Image Word | Image Word Location | Image Word Length, (pixels) | Other Image Word Parameters... |
|---|---|---|---|
| $wi_1$ | $(x, y)(wi_1)$ | $li(wi_1)$ | ... |
| $wi_2$ | $(x, y)(wi_2)$ | $li(wi_2)$ | ... |
| $wi_3$ | $(x, y)(wi_3)$ | $li(wi_3)$ | ... |
| $wi_4$ | $(x, y)(wi_4)$ | $li(wi_4)$ | ... |
| $wi_n$ | $(x, y)(wi_n)$ | $li(wi_n)$ | ... |

FIG. 5

| Transcription Word Sequence | Transcription Word Location | Transcription Word Length, (pixels) | Other Transcription Word Parameters... |
|---|---|---|---|
| $wt_1$ | $loct_1$ | $lt(wt_1)$ | ... |
| $wt_2$ | $loct_2$ | $lt(wt_2)$ | ... |
| $wt_3$ | $loct_3$ | $lt(wt_3)$ | ... |
| $wt_4$ | $loct_4$ | $lt(wt_4)$ | ... |
| $wt_n$ | $loct_n$ | $lt(wt_n)$ | ... |

FIG. 6

| | | | | | |
|---|---|---|---|---|---|
| Image Word $wi_1$ (1) | (862,86) | 16 | $wi_{56}$ (often) | (88,900) | 100 |
| Image Word $wi_2$ (SOFTWARE) | (668,195) | 168 | $wi_{57}$ (the) | (255,900) | 62 |
| $wi_3$ (PATENTS:) | (870,195) | 165 | $wi_{58}$ (case,) | (348,900) | 97 |
| $wi_4$ (A) | (592,275) | 19 | $wi_{59}$ (in) | (486,900) | 38 |
| $wi_5$ (LITIGATION) | (645,275) | 208 | $wi_{60}$ (the) | (556,900) | 62 |
| $wi_6$ (PERSPECTIVE) | (885,275) | 218 | $wi_{61}$ (early) | (642,900) | 107 |
| ⋮ | | | $wi_{62}$ (stages) | (780,900) | 123 |
| $wi_{50}$ (other) | (482,825) | 102 | $wi_{63}$ (of) | (950,900) | 41 |
| $wi_{51}$ (pre-litigation) | (622,825) | 278 | $wi_{64}$ (litigation.) | (1018,900) | 216 |
| $wi_{52}$ (processes,) | (962,825) | 198 | $wi_{65}$ (The) | (1310,900) | 61 |
| $wi_{53}$ (or,) | (1215,825) | 59 | $wi_{66}$ (article) | (1395,900) | 138 |
| $wi_{54}$ (as) | (1305,825) | 40 | $wi_{67}$ (highlights) | (88,975) | 204 |
| $wi_{55}$ (isso) | (1375,825) | 82 | ⋮ | | |

*FIG. 7*

| Transcription Word Location | Image Word Location |
|---|---|
| $loct_1$ | $(x, y)(wi_1)$ |
| $loct_2$ | $(x, y)(wi_2)$ |
| $loct_3$ | $(x, y)(wi_3)$ |
| $loct_4$ | $(x, y)(wi_4)$ |
| ... | |
| $loct_n$ | $(x, y)(wi_n)$ |

*FIG. 11*

| | |
|---|---|
| $331(wt_{50})$ | $(482,825)\ (wi_{50})$ |
| $337(wt_{51})$ | --- |
| $341(wt_{52})$ | $(622,825)\ (wi_{51})$ |
| $352(wt_{53})$ | $(962,825)\ (wi_{52})$ |
| $363(wt_{54})$ | $(1215,825)(wi_{53})$ |
| $367(wt_{55})$ | $(1305,825)(wi_{54})$ |
| $370(wt_{56})$ | --- |
| $373(wt_{57})$ | $(1375,825)(wi_{55})$ |
| $377(wt_{58})$ | $(88,900)\ (wi_{56})$ |
| $382(wt_{59})$ | $(255,900)\ (wi_{57})$ |
| $386(wt_{60})$ | $(348,900)\ (wi_{58})$ |
| $392(wt_{61})$ | $(486,900)\ (wi_{59})$ |

*FIG. 12*

METHOD FOR ALIGNING A TEXT IMAGE TO A TRANSCRIPTION OF THE IMAGE

FIELD OF THE INVENTION

The present invention relates generally to text image layout analysis, and more particularly to a method for aligning image region locations in a text image to strings in a text transcription of the image.

BACKGROUND

Document, or page, layout analysis is a document processing technique used to determine the physical and logical structures of a document in terms of the geometric, spatial and functional relationships of its document components, and in particular, its text document components. Its typical purpose is to automatically transform document structures from a nonelectronic medium, like paper, into an electronic medium. Document layout analysis is usually characterized as having two aspects: a structural segmentation process that analyzes the document to find the physical locations of document components, and a functional labeling process that identifies the document components in some manner with respect to their logical function in the document. Document components typically include single connected components and groups of connected components. Single connected components are regions of foreground (e.g., black) image pixel values such as noise specks, dots, dashes, lines and parts of a character that are touching. Groups of connected components, often called blocks, include a complete character consisting of one or more connected components, a word, text line, or group of text lines. The structural segmentation process typically produces the image locations of blocks. Blocks may be further analyzed in a manner that assigns functional labels to them according to their physical features or their "meaning," as imposed by the functional requirements of a particular type of document. For example, text blocks in a technical journal document may be identified and labeled as the title block, abstract, section titles, paragraphs and footnotes, while the blocks in a business letter document may be labeled as the return address, the inside address, the salutation, the body or message, and the closing. Functional layout analysis is sometimes referred to as syntactic or logical layout analysis. The structural segmentation of the text image and the functional labeling of the blocks may occur sequentially or simultaneously, depending on the particular implementation of a document layout analysis method.

Many document or page layout analysis techniques employ various kinds of a priori knowledge about the document domain in order to analyze a document layout from its image in order to make inferences about its logical structure and content. In many cases this a priori knowledge needs to be constructed manually by a person of relative skill in document layout description or understanding. For example, some of these techniques use, as an input to layout analysis, a form of a document model or document specification that describes some aspect of the document image structure of the class of document images that is expected as the input text image. An example of a document layout analysis system that uses a formal model as a document description is disclosed in G. Nagy, et al in "A prototype document image analysis system for technical journals", IEEE Computer, July, 1992, pp. 10–22. Nagy et al. disclose a document layout analysis system that uses a collection of publication-specific document grammars that are formal descriptions of all valid page formats that articles in a given publication can assume. The system uses the document grammar to guide a segmentation and labeling process that subdivides the page image into a collection of nested rectangular blocks. The document grammar for a specific journal consists of a set of block grammars, each of which subdivides a block horizontally or vertically into a set of subblocks. Nagy, et al acknowledge at pg. 16 that constructing the block grammars by hand is very time-consuming and is considered a weakness of their approach.

A. Dengel, et al. in "From Paper to Office Document Standard Representation" Computer, Vol 25, No. 7, July 1992, pp. 63–67, discloses another example of a document layout analysis system that uses a document model of a priori knowledge about a class of documents as input to the layout analysis process. In particular, this layout analysis system has as its purpose the transformation of printed documents, in this case business letters, into an ODA-conforming format. ODA, or Office Document Architecture, is an international electronic document representation standard designed for generating and exchanging electronic documents. The layout analysis process disclosed in Dengel et al involves three steps: layout analysis, logical labeling of the layout structures, and text recognition. The system includes two generic tree structures that provide different but complementary views of the structure of a class of documents.

Conventional document layout analysis systems typically include a text recognition operation as a component that produces the encoded content included in the image regions identified by the structural and logical layout components. Typically, image regions in an image are identified first, and then a conventional recognition operation is invoked to produce the text string content of the image regions and to link that content to the identified image regions. Linking image locations to specific encoded content is important when it is necessary or desirable to be able to reconstruct the original formatting of the document image from the output recognition file or to have the capability to edit the original document in a conventional word processing operation. It is also important for purposes of browsing an image to locate a particular region or to search for specific information.

Use of a priori knowledge of some kind about the document is likely to improve the results of the document layout analysis process simply because some possibilities about the identity of a particular document block can be excluded from consideration during the process, and accuracy and efficiency are likely to improve as a result. However, when the a priori information about the document takes the form of a complex document model, the benefit of having this knowledge in advance is often outweighed by the amount of time and effort and the level of skill involved in creating the model, as well as by the significant and additional computational complexity associated with handling the model.

The encoded content data of a document, in the form of a text string of the characters in a specific text image produced by a conventional text recognition system, has conventionally been part of the document layout analysis process, and not heretofore been considered to be a suitable form of a priori knowledge about the image because it has been thought to contain insufficient information to be a useful aid in the process. However, a transcription is relatively easy to produce in comparison to the more formal document models used by the examples of document layout analysis systems discussed previously.

SUMMARY OF THE INVENTION

The present invention is a type of document layout analysis technique that makes use of a very prevalent and available source of a priori knowledge about a text image: namely, a transcription of the image. The present invention identifies image regions in a text image and associates, or labels, them with string components of a transcription of the text image, a process that will be referred to as "aligning" the image to the transcription.

The image-transcription alignment technique of the present invention is premised on the discovery that a transcription available for a text image provides important information about how glyphs occurring in the text image are arranged. In particular, portions of an image, called image regions, that are identified by image locations may be matched to strings in the transcription, thereby associating, in an output data structure, the strings, or labels, in the transcription with the identified image regions. This association may then be used by a subsequent operation on the text image to facilitate the location of identified glyphs in the image region, to improve the efficiency of the subsequent operation, or to accomplish any other operation that benefits from prior labeling of image regions with encoded text strings. Examples of image regions include regions that bound various geometric, syntactic or semantic image units such as words, text lines, sentences or paragraphs, formatted or itemized lists, headings, and footnotes. The ability to link the content of a transcription to various ones of these types of image regions may depend, to a certain extent, on the content and interpretation of the information in the transcription.

The present invention, then, provides a method of operating a machine to label image locations of image regions in a text image with label data available in a transcription associated with the text image. The machine the method operates includes a processor and a memory device for storing data. The data stored in the memory device includes the instruction data the processor executes to operate the machine, and the processor is connected to the memory device so that it can access the stored data. The image-transcription alignment method includes operating the processor to store, in the memory device of the machine, an image definition data structure defining an image, referred to as a text image, including a plurality of glyphs, and a transcription data structure, referred to as a transcription, associated with the text image. The transcription includes an ordered sequence of transcription label data items, referred to as transcription labels, indicating information about the glyphs occurring in the text image and arranged in an ordered label sequence indicating an expected positional glyph sequence of the plurality of glyphs occurring in the text image. The processor is then operated to produce an ordered image region sequence of image regions occurring in the text image. Each image region is defined with respect to its location in the text image relative to at least one glyph occurring in the text image, and indicates an image region location defined according to an image coordinate system describing the text image. An ordered transcription region sequence of transcription regions occurring in the transcription is also produced. Each transcription region is a sequence of at least one transcription label. A matching operation is then performed to match image regions in the ordered image region sequence to transcription regions in the ordered transcription region sequence. The matching operation computes similarity measurements measuring the similarity between image regions and transcription regions, and finds a best match between the image regions in the ordered image region sequence and transcription regions in the ordered transcription region sequence that optimizes the similarity measurements. An image-transcription alignment data structure is produced from the results of the matching operation that indicates transcription regions paired to image region locations of matching image regions. In one embodiment, the matching operation is implemented as a dynamic programming operation that aligns image regions in the ordered image region sequence to transcription regions in the ordered transcription region sequence using similarity measurements, called scores, between image region parameters and transcription region parameters, subject to the constraint that region order in each of the ordered transcription region sequence and the ordered image region sequence is maintained during the dynamic programming operation.

A particularly common and useful implementation of the image-transcription alignment technique of the present invention is as a supervised method for finding image word locations and labeling each word location with a string of character codes in the transcription. The strings of character codes in the transcription that represent words provide a priori information about regions in the text image that are likely to contain the glyphs indicated by the strings of character codes in the transcription.

In this aspect of the method, the text image and transcription data structures are read and stored in memory as previously described. The glyphs in the text image represent characters in an image character set. The processor is operated to produce an ordered image word sequence of image words occurring in the text image, with each image word being an image region in the text image that includes at least one glyph. The processor is also operated to produce an ordered transcription word sequence of transcription words occurring in the transcription, with each transcription word being a sequence of at least one transcription label indicating a character code in the image character set. Then, a matching operation is performed that matches image words in the ordered image word sequence to transcription words in the ordered transcription word sequence. The matching operation produces an image-transcription alignment data structure indicating image words paired to matching transcription words.

As previously described, a particular embodiment of the matching operation is implemented as a dynamic programming operation that aligns image words in the ordered image word sequence to transcription words in the ordered transcription word sequence by finding a path from an initial node to a final node in a lattice structure that represents the two word sequences. Image and transcription parameters are used for the matching, or alignment, process; in particular, word lengths are used, where image word lengths are pixel distances estimated from the image and transcription word lengths are estimated from the number of characters in the transcription word multiplied by an estimated character image width of the characters in the input text image. Scores in the path through the lattice structure are computed using a function of the word lengths, subject to the constraint that word order in each of the ordered transcription word sequence and the ordered image word sequence is maintained during the dynamic programming operation.

One use for this word alignment technique specifically involves an invention for the automatic training of character templates disclosed in copending U.S. patent application, Ser. No. 08/431,223, assigned to the same assignee as the present invention. That application discloses a method for automatically training font-specific binary character templates using character image samples identified in an input image, and using a transcription associated with the input image to label the image samples. An implementation of the template training technique models the input text image and the transcription, which may be errorful, as Markov sources in the form of stochastic finite state transition networks that are merged into a single network. A dynamic programming technique is then used to decode the input image to produce image locations of character image samples labeled according to the transcription labels of the associated transcription. The decoding process disclosed functionally compares an ideal image of character templates positioned in an image plane to the observed input image by determining a best path through the merged network from an initial node to a final node; the path is determined as a result of maximizing a log likelihood score that is the sum of individual log likelihood scores computed for individual transitions taken in the path. Decoding in this manner is essentially done on a pixel by pixel basis, is accomplished through successive iterations, and can be computationally demanding and complex. The present invention can reduce the computational complexity and the number of iterations required of this pixel by pixel decoding to decoding on a word by word basis, since the present invention produces an association between image regions that have been determined to correspond to words and strings in the transcription that, as a result of the alignment process, indicate character codes that should properly identify the glyphs in the image words.

In addition, with reference to the copending template training technique, a particularly errorful input transcription may have a significant effect on the number of iterations required to achieve accurate image sample identification and labeling; for example, deletions of entire words or lines in the transcription are very likely to adversely affect training efficiency. Thus, the present invention can also provide, in a preprocessing step to the decoding process in the template training invention, a measure of confidence in the success of decoding by word based on the quality of the transcription; the total score produced by the matching operation as a result of finding the best path through the lattice structure in the present invention can provide an indication of how well portions of the transcription have been aligned with portions of the image at the word level. If this information indicates that word level alignment has been largely successful and that there is a good correlation between portions of the transcription and portions of the input image, the training technique can either proceed with merging the image and transcription networks, and perform template-level, pixel by pixel decoding of the image to produce the training data, or the technique can perform decoding on a word by word basis. For example, the path data will indicate which portions of the transcription have been successfully aligned with the image, and these portions may be used for training purposes, while poorly aligned portions may be ignored. If the path data provided indicates that word level alignment has not been particularly successful, the training technique may indicate this to a user who has the ability to provide an improved transcription, or the technique may be modified to abandon use of the transcription altogether, and to perform the decoding of the input text image without the aid of the transcription.

The novel features that are considered characteristic of the present invention are particularly and specifically set forth in the appended claims. The invention itself, however, both as to its organization and method of operation, together with its advantages, will best be understood from the following description of the illustrated embodiment when read in connection with the accompanying drawings. In the Figures, the same numbers have been used to denote the same component parts and acts.

BRIEF DESCRIPTION OF THE DRAWINGS

FIG. 5 schematically illustrates an example of the organization of an intermediate data structure indicating image word locations and image word parameters to be used by the present invention;

FIG. 6 schematically illustrates an example of the organization of an intermediate data structure indicating transcription word locations and transcription word parameters to be used by the image-transcription alignment method of the present invention;

FIG. 7 schematically illustrates the intermediate data structure organized as shown in FIG. 5 indicating selected image word locations and image word parameters of the text image of FIG. 3, for use in the illustrated embodiment of the present invention;

FIG. 11 schematically illustrates an example of the organization of the output data structure produced by the image-transcription alignment method of the present invention;

FIG. 12 schematically illustrates the image-transcription alignment data structure organized as shown in FIG. 11 indicating the results of the alignment performed according to the steps of FIG. 9 on the selected data shown in FIG. 10.

Figure 1:
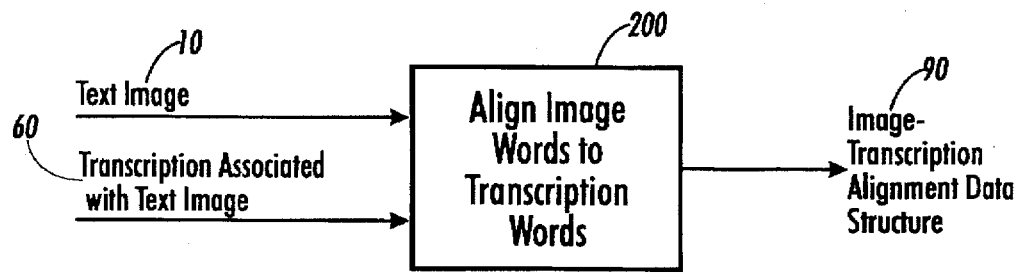
FIG. 1 is a general block diagram of the image-transcription alignment method of the present invention showing the input and output data structures.

While the present invention will be hereinafter described in connection with an illustrated embodiment, it will be understood that it is not intended to limit the invention to that embodiment. On the contrary, it is intended to cover all alternatives, modifications and equivalents as may be included within the scope of the invention as defined by the appended claims.

DETAILED DESCRIPTION OF AN ILLUSTRATED EMBODIMENT

The following discussion is organized as follows: Section A provides definitions of terminology used in the discussion of the present invention. Section B provides a system overview of the image-transcription alignment method, and discusses the structural features of the data structures used and produced by the method. Section C presents an illustrated embodiment of the invention, and Section D describes additional features and improvements. Section E concludes the discussion of the invention with a description of the machine that the present invention may operate.

A. Conceptual Framework

The image-transcription alignment method of the present invention relates to operating a machine that includes a processor, and to processing electrical or other physical signals to produce other desired physical signals. The detailed description which follows is presented largely in terms of symbolic representations of operations of data within the memory of the machine. These descriptions and representations, which are algorithmic in nature, require physical manipulations of physical quantities such as electrical or magnetic signals that are capable of being stored, transferred, combined, compared, and otherwise manipulated. It proves convenient at times, principally for reasons of common usage, to refer to these signals by a variety of terms, including bits, values, elements, pixels, symbols, characters, terms, numbers, data items, or the like. However, all of these terms and the additional terms defined below are convenient labels applied to appropriate physical quantities. Further, the manipulations performed are often referred to in terms, such as adding, comparing, or determining, which are commonly associated with mental operations performed by a human user. The capability of a human user is neither necessary nor desirable in the operations described herein which form part of the present invention. In addition, the algorithmic descriptions of the invention that are presented herein for operating the machine are not inherently related to any particular processor, machine, or other apparatus. The machine may be specially constructed for the required purpose of carrying out the invention or it may comprise a general purpose computer selectively activated or reconfigured by a computer program stored in the computer that implements the invention. Useful machines for performing the operations of the present invention include general purpose digital computers or other similar devices configured as described below and in the claims.

The following terms provide the framework for describing the embodiment of the claimed invention illustrated in the accompanying drawings. These terms have the meanings indicated below throughout this specification and in the claims, rather than any meanings that may occur in other sources, such as, for example, any documents that are incorporated by reference herein elsewhere in this description.

The term "data" or "data item" refers herein to physical signals that indicate or include information. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values." A first item of data "indicates" a second item of data when the second item of data can be obtained from the first item of data, when the second item of data can be accessed using the first item of data, when the second item of data can be obtained by decoding the first item of data, or when the first item of data can be an identifier of the second item of data. For example, data structure 80 in FIG. 6 indicates data items 82, 84, and 86 since data structure 80 is defined to be accessible to the processor of a machine in the organization shown in FIG. 6; in addition, transcription word $w_{t_i}$ indicates transcription location $loc_{t_i}$ since data item 82 may be used by the processor to obtain data item 84 in data structure 80.

A "processor-controlled machine" or "processor" is any machine, component or system that can process data, and may include one or more central processing units or other processing components. Any two components of a machine or system are "connected" when there is a combination of circuitry that can transfer data from one of the components to the other. An "instruction" is an item of data that is accessible to and executable by a processor for use in determining its own operation. An "operation" refers to a set of instructions the processor uses to determine its operation. An operation typically defines a mapping of a first one or set of items of data (an input of the operation) to a second one or set of items of data (an output of the operation.) An operation "produces" the second one or set of data items when the operation begins without the second data item and performing the operation results in the second data item. A processor "uses" data in performing an operation when the result of the operation depends on the value of the data.

An "image" is a pattern of light. Data "defines" an image when the data includes sufficient information for the processor to directly produce the image, such as by presenting the image on a display device or by causing the image to be printed on a marking medium such as paper. Data defining an image may be referred to as "image definition data". For example, a two-dimensional (2D) array can define all or any part of an image, with each item of data in the array providing a value indicating the color of a respective location of the image. In this type of image representation, each such image location is conventionally called a "picture element," or "pixel," and represents a small unique region of the image within which the color is constant. In images of black marks on a white background, for example, the value in a pixel indicates black or white, where black is intended to represent a respective mark or active position in the image. While the description that follows may refer to such black-on-white, or binary, images, the invention described herein is generally applicable across a broad range of image representation techniques.

"Character" as used herein means a single, discrete, abstract element or symbol. For example, a character can include an abstract symbol that appears in a written or printed form of a language. Characters in a language can include not only alphabetic and numerical elements, but also punctuation marks, diacritical marks, mathematical and logical symbols used in mathematical notation such as equations, and other elements used in the written or printed form of the language. More generally, characters can include phonetic, ideographic, or pictographic elements in addition to alphanumeric elements. For example, symbols in pictographic languages and symbols representing musical notation are included in the term character. All of the characters related to a particular language or other symbol notation such as music comprise a "character set." A "word" is a set of one or more characters that is treated as a semantic unit in a language. A "text" or "string" is a sequence of characters; a "subsequence" or "substring" of characters is a set of one or more consecutive characters within a text or string; the characters of a text or string may form words and other subsequences within the text.

A "character code" is an item of data in a processor-controlled machine or system that defines, or represents, a character (the abstract symbol) to the processor. The encoding of a set of characters, such as those that belong to a language, involves defining a set of character codes that includes a respective character code for each character in the set. An example of a set of character codes is the set of ASCII codes for the symbols that make up the English language.

A "glyph" is a single instance, or example, of a character that is realized as an image, for example on a marking medium such as paper or on a display screen. For example, an image that is produced by a scanning operation performed on a paper document that includes text and that is received by scanning circuitry includes a plurality of glyphs, each of which is an image that represents a realized instance of a respective one of the characters in the text.

The terminology "image definition data defining an input text image" (hereafter also referred to as a "text image data structure," or simply as a "text image") refers to a data structure, suitable for storage in a memory device of a processor-controlled machine, that defines a text image in which a plurality of glyphs occur in the space defined by the image. An "image character set" is the set of characters represented by the plurality of glyphs occurring in a text image. The organization of the text image data structure is such that individual pixel locations are accessible by the processor, but the pixels that comprise an individual glyph or a group of glyphs are not initially identified as a unit of data that is accessible to the processor, and no information is initially available to the processor as to whether a specific x,y coordinate position in the text image indicates one of the pixels included in a glyph. An image may be "one-dimensional" or "two-dimensional;" a one-dimensional (1D) text image refers to a single horizontal row of glyphs, as, for example, represented by a single line of text in a document, while a two-dimensional (2D) text image, by definition, has a vertical size dimension larger than an image of a single horizontal row of glyphs. A 2D text image is conceptually analogous to a page of a document, and may frequently represent an image of an actual physical page, with glyphs being vertically, as well as horizontally, distributed in the 2D space; however, an input 2D text image in the present invention is not intended to be limited in any manner to an entire page, or to a single page of a document. A text image is not limited to include only glyphs, and other image objects such as graphical objects or shapes, pictures, halftone images, line drawings, photographs, other pictorial elements, or images that constitute noise may be included in the image. For convenience, collections of pixels representing image objects that are not glyphs will be referred to as "nonglyphs."

Figure 3:
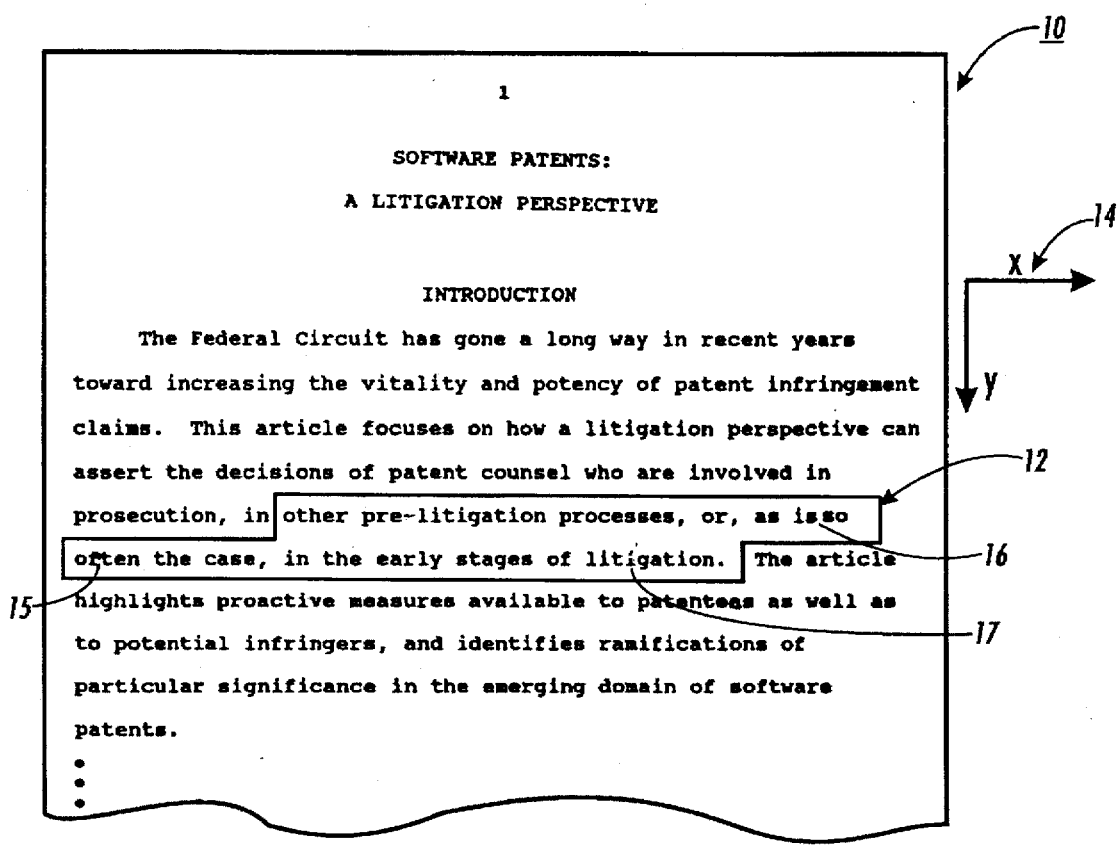
FIG. 3 illustrates a two-dimensional text image that is an example of the type of image that is suitable as input to the image-transcription alignment method of the present invention.

FIG. 3 illustrates an example of an image that is of the type that is suitable as input to the image-transcription alignment method of the present invention; while the image is shown in FIG. 3 in a displayed form in which it is perceptible to a human, FIG. 3 is intended to represent an image definition data structure 10 defining the pixel contents of the image to the processor. Text image data structure 10 includes pixels that define realized instances of characters in the character set that comprises the English language; each discrete representation of an English language character in text image 10 is a glyph. Text image 10 illustrates a portion of the data structure representing a binary (e.g., black and white) image of the type that would be produced by scanning a professional article from a collection of such articles.

The image coordinate system defining how the pixels of an image are organized in the data structure typically depends on the type of information represented in the image. In the illustrated embodiment of the invention described below, images, including input text image 10 in FIG. 3, are assumed to be rectangular, and to have an image coordinate system 14 (FIG. 3) in which x increases to the right, y increases downward, and x=y=0 is at the upper left corner of the image. A pixel location in a text image is given by a set of image coordinates, (x, y).

An "image region" is a two-dimensional segment, or portion, of a text image that is identifiable by its relationship to glyphs occurring in the text image. For example, the 2D segment of a text image that bounds a horizontally positioned group of glyphs, commonly referred to as an image text line, is an image region, as is the 2D segment of a text image that bounds the image pixels that have background color values and that occur between two horizontally positioned group of glyphs. An "image region parameter" is a measurement of a geometric attribute, feature or characteristic of an image region. For example, the size in area, or the length of one of the bounding sides of an image region are examples of image region parameters.

Some nomenclature in the field of typography is useful for defining some additional terminology that is used in the context of the present invention. An "image baseline" is defined as the imaginary reference line upon which realized instances of characters (i.e., glyphs) without descenders appear to rest. A "descender" is defined as that portion of a printed character that falls below the baseline, as in the characters "j" "t" and "y." While an image baseline is conventionally thought of as being a horizontal line when the text image represents glyphs in the English language character set, an image baseline in a text image is not so restricted herein, and is intended to encompass any reference line in the text image consistent with expressing information in the character set represented by the glyphs occurring in the image. An "image word" is an image region that contains a grouping of at least one glyph positioned with respect to a common image baseline and with respect to which an adjacent glyph positioned on the same image baseline as the glyph grouping may be determined to be excluded from the glyph grouping on the basis of the color and quantity of the pixels between the glyph grouping and the adjacent glyph. An "image word parameter" is a measurement of a geometric attribute, feature or characteristic of an image word. An "image word length" is a measurement of the estimated distance along the image baseline of an image word. An "image character width" is a measurement of the estimated width along the image baseline of a single glyph. These measurements are typically expressed in pixels but need not be. Image word length and image character width are examples of image word parameters.

The source device that produces the input text image is independent of and unrelated to the operation of the present invention. The input text image may be produced by a scanning, digital faxing or digital copying operation applied to an existing physical document; the input text image may also be a synthetic image created by a user using any suitable processor-controlled machine.

A "transcription data structure" or "transcription" as used herein is a data structure indicating a message string that includes an ordered arrangement of message substrings, each of which indicates at least one character code representing a character in a character set. Each substring is referred to as a "transcription label data item," or simply as a "transcription label."

A transcription is said to be "associated with" a specific text image when the transcription data structure meets one of two conditions: (1) The transcription data structure is, or is capable of being produced from, the output of a recognition operation performed on the specific text image. The recognition operation may be processor-controlled, such as a computer-implemented recognition or decoding operation performed on the text image. Or the recognition operation may be performed by a user using a processor-controlled machine; for example, a user may produce the transcription data structure by visually inspecting the text image and entering character codes using a conventional input device, such as a keyboard, that produces signals indicating the character codes. (2) The transcription data structure is, or is capable of being produced from, a data structure that is an input source to an image rendering operation, such as a document formatting operation, that produces the specific text image. The input text image with which a transcription is associated is referred to as the "associated text image."

A "paired glyph" in a text image, when used with respect to a transcription label in a transcription associated with the text image, is a term that refers to a glyph occurring in the text image with which the transcription label, in view of its position in the ordered arrangement of transcription labels in the transcription, can be paired by visual inspection of the associated text image; the transcription label of a paired glyph indicates a character code that identifies the glyph as a character in the image character set. A "correct transcription label" is a transcription label indicating a character code for which it can be determined that the character code correctly identifies a paired glyph. A "correct transcription" is a transcription that includes a correct transcription label for each paired glyph in the text image. A "transcription label error" is a transcription label indicating a character code for which it can be determined that the character code incorrectly identifies a paired glyph, or for which it can be determined by visual inspection that no glyph occurs in the associated text image that can be paired with the character code indicated by the transcription label. A transcription label error also includes a missing transcription label. An "errorful transcription" is a transcription that includes at least one transcription label error. Common types of transcription label errors include character deletions, where the transcription does not include a transcription label for a glyph occurring in the associated text image; character insertions, where the transcription includes a transcription label that cannot be paired with a glyph occurring in the image by visual inspection; and character substitutions, where the transcription includes a transcription label that indicates an incorrect character code for a paired glyph occurring in the associated text image. Transcription label errors may also include combinations and multiple occurrences of these types of errors. For example, the transcription may indicate several missing transcription labels occurring in a sequence, representing a missing word or line of text in the transcription.

Figure 4:
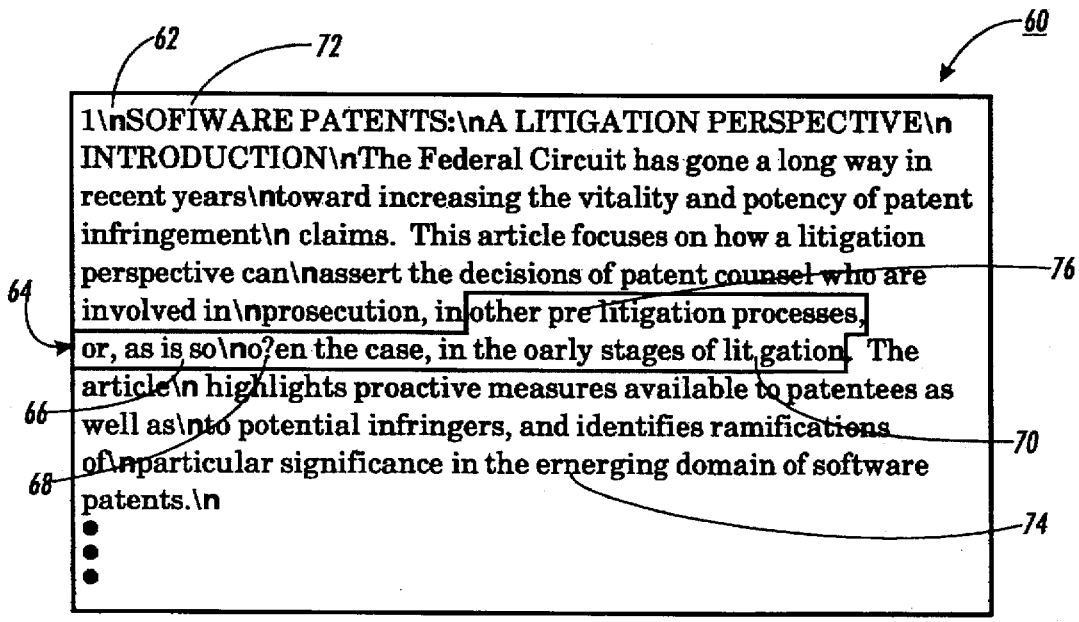
FIG. 4 illustrates a transcription data structure that includes a sequence of transcription labels that indicate a transcription associated with the text image of FIG. 3, and that is an example of the type of transcription that is suitable as input to the present invention.

FIG. 4 illustrates a transcription 60 that is associated with text image 10 (FIG. 3) and that includes a single ordered sequence of transcription labels. It can be seen by visual inspection of text image 10 that most of the transcription labels in transcription 60 indicate individual characters that can be paired with respective single glyphs in text image 10, when text image 10 is read by a human in the conventional reading order for an English language document. Transcription 60 includes several transcription label errors. For example, transcription label 68 indicates character "?" which is a transcription label error, since it can be seen by visual inspection of text image 10 that character "?" 68 has been substituted for one or both of the glyphs "f" or "t" 15 (FIG. 3) in text image 10. In the terminology used above, transcription label 68 can be characterized as a deletion in combination with a substitution. Other transcription label errors specifically called out in transcription 60 include transcription label 72, a substitution error; transcription label 74, a combination of insertion and substitution errors; and transcription labels 70 and 76, which indicate substitution errors (i.e., "space" characters have been substituted for the correct character codes indicating "i" and "–", respectively).

A transcription may include a transcription label that is referred to as a "tag" or "tag data," as long as the tag transcription label is distinguishable in some manner from transcription labels that indicate character codes that represent glyphs in an associated text image. A tag indicates nonliteral information about the text occurring in the text image such that, when the tag is interpreted by an appropriate document processing operation, it produces display features that are perceptible in the format of, or as part of the glyphs in, the associated text image. Tag data includes information that identifies format characteristics of the text image such as page, paragraph and line breaks and line spacing that is deterministic of the location of a glyph in the text image; that specifies one or more appearance attributes of one or more glyphs, such as the font or font variation in which a glyph appears; or that results, when the document is formatted, in producing glyphs in the text image to which no explicit transcription label in the transcription can be mapped. The various types of information that may be indicated by a tag is often referred to as "markup information." Tag data may be found in data structures representing documents prepared in various types of markup languages, such as SGML (Standard Generalized Markup Language), ODA (Office Document Architecture), HTML (Hypertext Markup Language), GML (Generalized Markup Language), TeX and LaTeX.

In FIG. 4, transcription 60 includes "new line" character 62, shown as the bold face symbols \n for purposes of illustration. New line character 62 is is an example of a tag transcription label that indicates that the character labels following the new line character have paired glyphs that are positioned in the next image line of the associated text image; new line characters are commonly inserted in data structures indicating text by users preparing a text document using a text editor, or by a conventional OCR operation. Transcription labels that indicate character codes representing new line characters are clearly distinguishable from transcription labels that indicate character codes that represent glyphs in associated text image 10, and so transcription 60 is a transcription that is suitable for use as an input to the image-transcription alignment technique of the present invention.

A "transcription word boundary character code," or more simply, a "transcription word boundary," is a character code value of a transcription label that indicates a character included in the image character set of an associated text image that is conventionally used in the image character set to separate words in the language, or symbol set, represented by the text in the associated text image. For example, a processor-controlled machine that represents English text in an encoded form when stored in machine memory typically encodes a "space" character as a character code in the English language character set; the "space" character is conventionally used to separate words in English text, and is an example of a transcription word boundary character code. Another example of a transcription word boundary is a character code that indicates tag data such as the "new line" character. A "transcription word" is an ordered sequence of at least one transcription label that indicates a character code for a glyph and that is preceded and followed by transcription labels that each indicate a transcription word boundary. A "transcription word parameter" is a measurement of a transcription word. A "transcription word length" is a measurement of the length of a transcription word computed using the image character width of an associated text image; transcription word length is an example of a transcription word parameter.

One aspect of the present invention is concerned with determining a relationship between transcription words in a transcription and image words in an associated text image. This relationship may be expressed in different ways in the output data structure produced by the method of the invention. One convenient way is to establish a relationship between the location of a transcription word in the transcription data structure and the image coordinates of an image word in an associated text image that is estimated by the invention to contain the glyphs representing the characters indicated by the character codes in the transcription word.

The location of an image word in a text image may be represented in a variety of ways. One way is to refer to the location of the beginning of the image word with respect to its image baseline, and the terminology that follows adopts this approach; another way is to refer to the upper left corner of a bounding box that surrounds the image word. It is understood, however, that any suitable way of describing the location of an image word in a text image is intended to be included within the scope of the claims that define the invention. For purposes of describing the illustrated embodiment, then, an "word origin image location" refers to a set of image coordinates indicating the image baseline origin location of a first glyph in the grouping of glyphs that comprise an image word. An "image word location" is a data item that indicates the word origin image location of the image word in the text image.

The location of a transcription word in the transcription may also be represented in a variety of ways. Consistent with the convention adopted to represent the location of image words, the location of a transcription word may be established by reference to the location of the beginning of the word in the transcription, and the terminology that follows continues this convention; it is understood, however, that any suitable way of establishing the relationship of a transcription word in the transcription to an image word in an associated text image is intended to be included within the scope of the claims that define the invention. A "word origin transcription label" refers to the first transcription label in the ordered sequence of transcription labels that comprise a transcription word. A "transcription data structure word location," or simply a "transcription word location," is a data item that indicates a data structure location of a word origin transcription label in the transcription data structure. The transcription word location may be represented as a pointer to a word origin transcription label location in the transcription data structure, or may be the actual value of a word origin transcription label location in the transcription data structure, or any other data value that indicates a data structure location in the transcription.

A transcription is "aligned" with an associated text image when an operation is performed using the transcription and the associated text image that produces a data structure indicating the relationship between transcription words in the transcription and image words in the associated text image. An "image-transcription alignment data structure," or "image-transcription alignment" is a data structure that includes data indicating the relationship between a transcription word in a transcription and an image word in a text image associated with the transcription. An implementation of an image-transcription alignment data structure is shown in data structure 90 of FIG. 11 which includes transcription word location 94 paired with an image word location 96.

B. General Features

Figure 2:
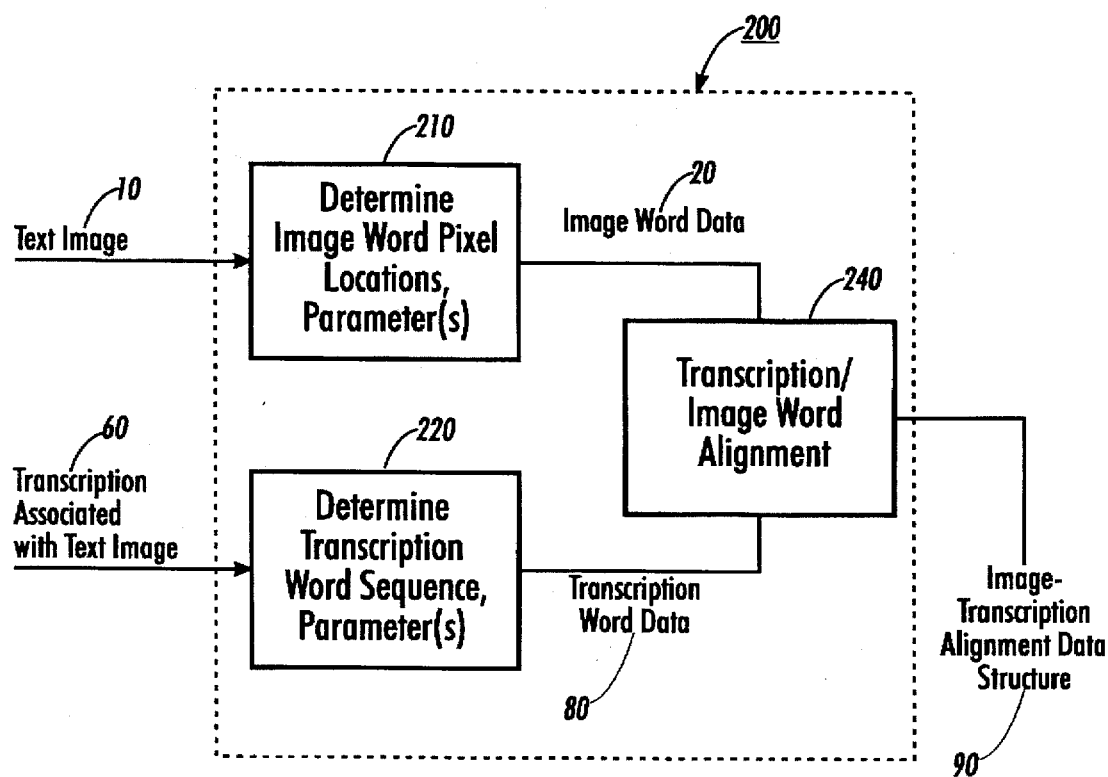
FIG. 2 is an expanded block diagram of FIG. 1 showing more detail of the processing components and the intermediate data structures.

FIGS. 1 and 2 illustrate the general features of the image-transcription alignment technique of the present invention. The input and output data structures of the image-transcription alignment technique 200 of the present invention are illustrated in the high level block diagram of FIG. 1. A text image, such as text image 10 of FIG. 3, is the input image containing image words for which image word locations are desired. A transcription data structure that is associated with text image 10, such as transcription 60 of FIG. 4, is the input transcription containing transcription labels. Image-transcription alignment technique 200 uses the ordered arrangement of the transcription labels and their character code values to estimate the image word locations of the image words in text image 10, and, additionally if required by a subsequent operation, to pair each of those estimated image word locations with the location of a transcription word in the transcription; the paired transcription word is the word in the transcription that is estimated to represent a sequence of character codes indicating the characters represented by the glyphs that are included in the image word at the estimated image word location. The result of establishing this relationship between the transcription and the text image, referred to as aligning the transcription to the image, is captured in image-transcription alignment data structure 90.

FIG. 2 shows an expanded block diagram illustrating three major functions of image-transcription alignment technique 200, and two intermediate data structures. Image analysis function 210 performs operations on text image 10 to produce the input image data needed to perform the image-transcription alignment function in box 240. The input image data is illustrated in FIG. 2 as image word data structure 20. An example of the contents and organization of image word data structure 20 is shown in FIG. 5, which is described in more detail below in connection with the discussion of an illustrated embodiment. Generally, image word data structure 20 indicates an ordered word sequence of image words.

Similarly, transcription analysis function 220 performs operations on transcription 60 to produce the input transcription data needed to align the image with the transcription. The input transcription data is illustrated in FIG. 2 as transcription word data structure 80. An example of the contents and organization of transcription word data structure 80 is shown in FIG. 6, which is also described in more detail below. Generally, transcription word data structure 80 indicates an ordered word sequence of transcription words.

Image-transcription alignment operation 240 uses image word data structure 20 and transcription word data structure 80 to establish a relationship between the image words identified in text image 10 and the transcription words identified in transcription 60. Operation 240 accomplishes this by using a dynamic programming operation that, in general terms, aligns transcription words in the ordered transcription word sequence to image words in the ordered image word sequence using similarity measurements between image word parameters and transcription word parameters. The dynamic programming operation is implemented subject to the constraint of maintaining word order in each of the ordered transcription word sequence and the ordered image word sequence during alignment.

The dynamic programming operation constructs a two-dimensional lattice consisting of a set of nodes and including transitions between pairs of nodes. Each transition represents a sequence of zero or more image words and a sequence of zero or more transcription words taken from a sequence of image words and a sequence of transcription words, respectively, such that a node represents word-end pairs. In the sequence of zero or more words associated with a transition, the first word of the sequence begins after the word-end indicated by the node at the start of the transition, and the last word of the sequence ends at the word-end indicated by the node at the end of the transition. A sequence of words associated with a transition may be zero, called a"null" word, where either the image word parameter or the transcription word parameter being measured is zero or the equivalent, indicating a deletion of one or the other in the respective word sequence. The dynamic programming technique produces a "best" path through the lattice from a first node to a final node. The criterion for determining whether a path through the lattice is a best path is based on a cumulative score computed from scores associated with transitions along the path into each node from previous nodes. Identifying information about the transitions and nodes that produced the cumulative score are stored in memory. Nodes and transitions of the best path are then available from the stored node and transition information by backtracing from the final node to the initial node along the best path. The node and transition information, in turn, identifies the relationship, or alignment, between transcription words and image words. Image-transcription alignment operation 240 then produces image-transcription alignment data structure 90 which includes data available from the best path that indicates the alignment relationship between transcription words and image words. FIG. 11 illustrates an example of image-transcription alignment data structure 90, and will be described in more detail below in the following discussion of an illustrated embodiment.

C. An illustrated embodiment

The description of the illustrated embodiment that follows presumes a knowledge of dynamic programming techniques. One of many useful texts in this regard is Fundamentals of Speech Recognition, by L. Rabiner and B.-H. Juang, (Prentice Hall 1993), in particular portions of Chapters 4 and 6 at pp. 200–241 and 334–340, respectively. These chapter portions are hereby incorporated herein by reference as if set out in full. Additional information on Viterbi algorithms can be found in Huang, Ariki and Jack, *Hidden Markov Models for Speech Recognition,* Edinburgh University Press, 1990, Chapter 3, Section 3.2, at pp. 70–81. These chapter excerpts are also hereby incorporated herein by reference as if set out in full.

Figure 8:
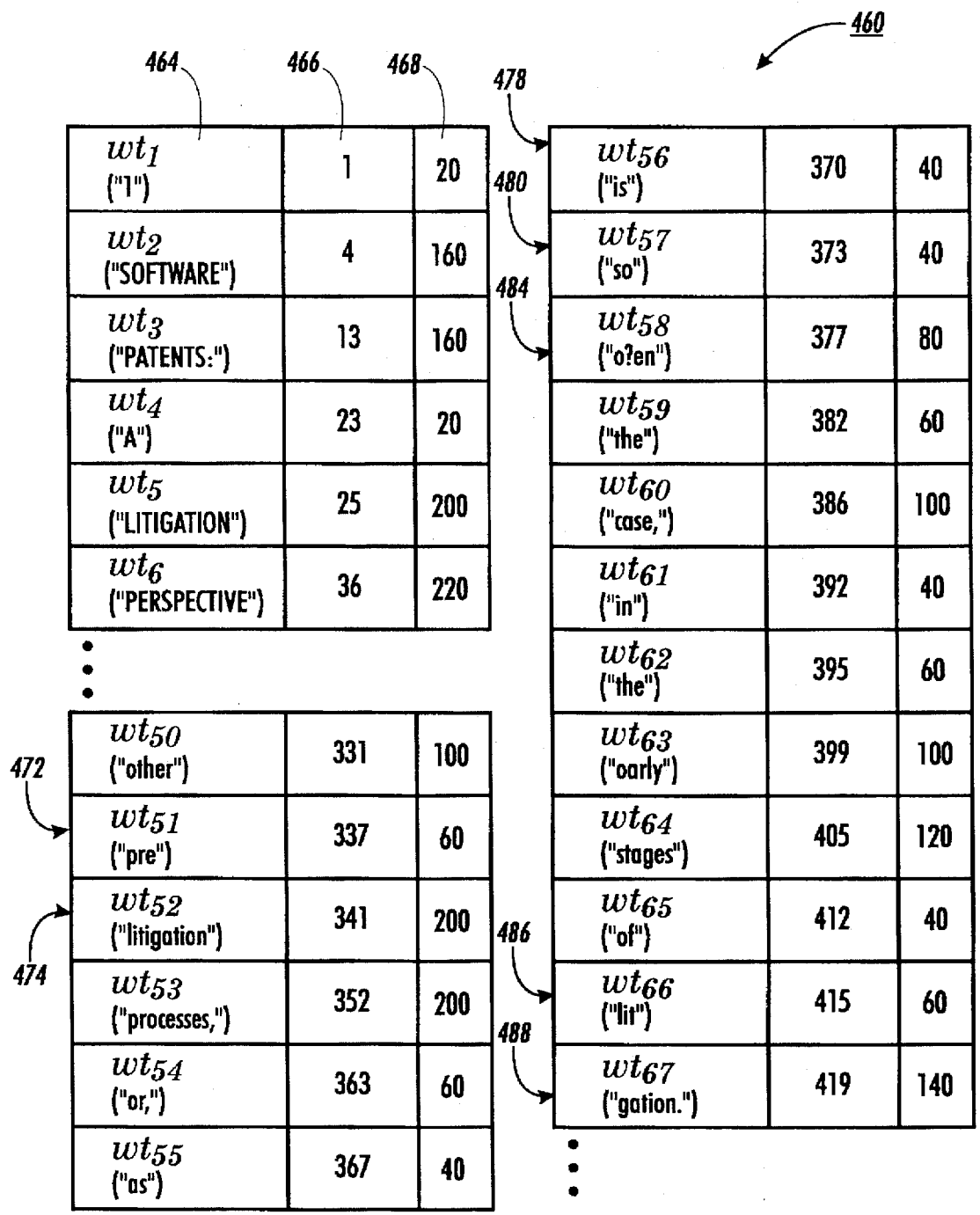
FIG. 8 schematically illustrates the intermediate data structure organized as shown in FIG. 6 indicating selected transcription word locations and transcription word parameters of the transcription of FIG. 4, for use in the illustrated embodiment of the present invention.
Figure 9:
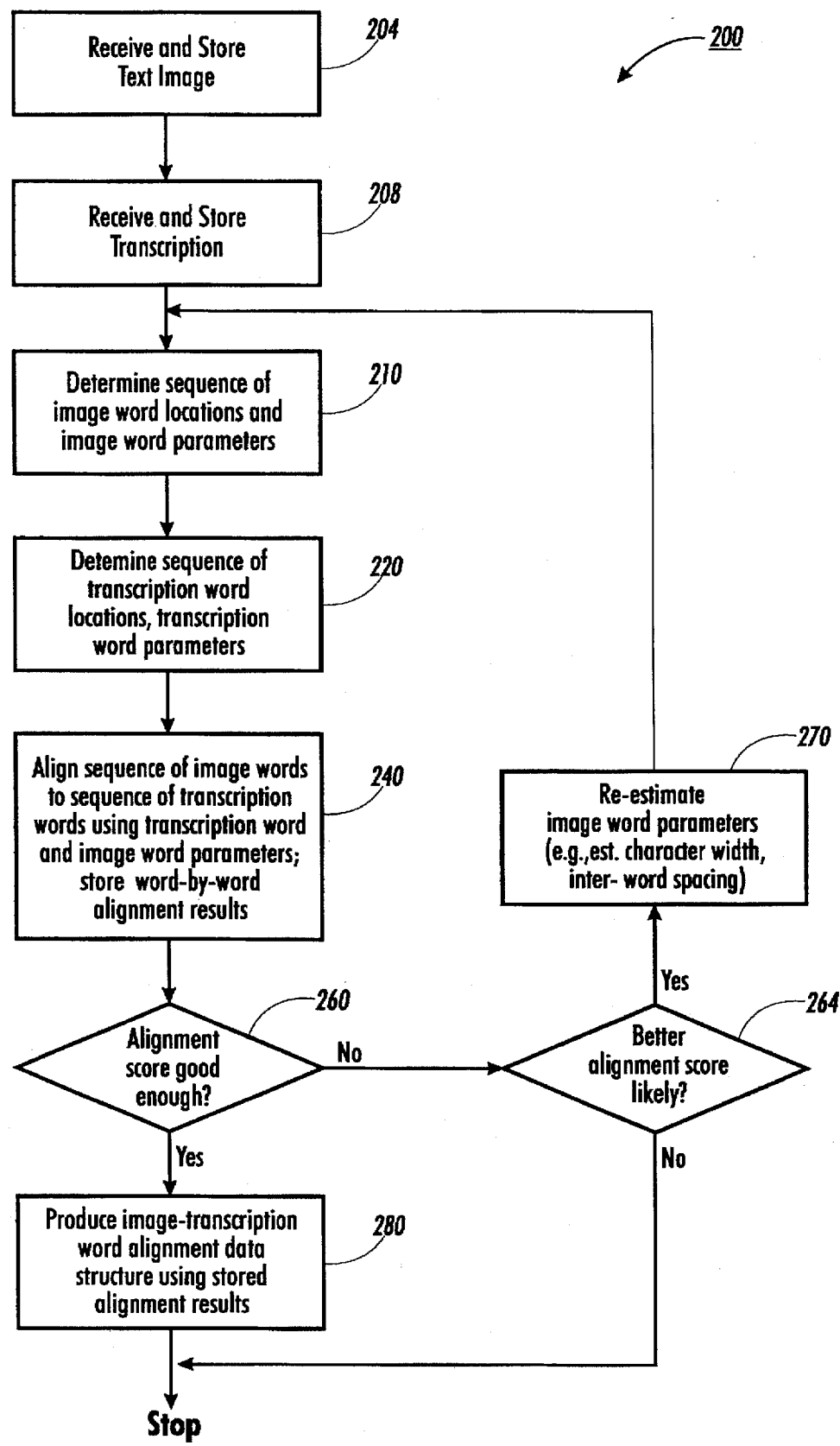
FIG. 9 is a flow chart illustrating the general processing steps of aligning a sequence of image words to a sequence of transcription words according to the invention.
Figure 10:
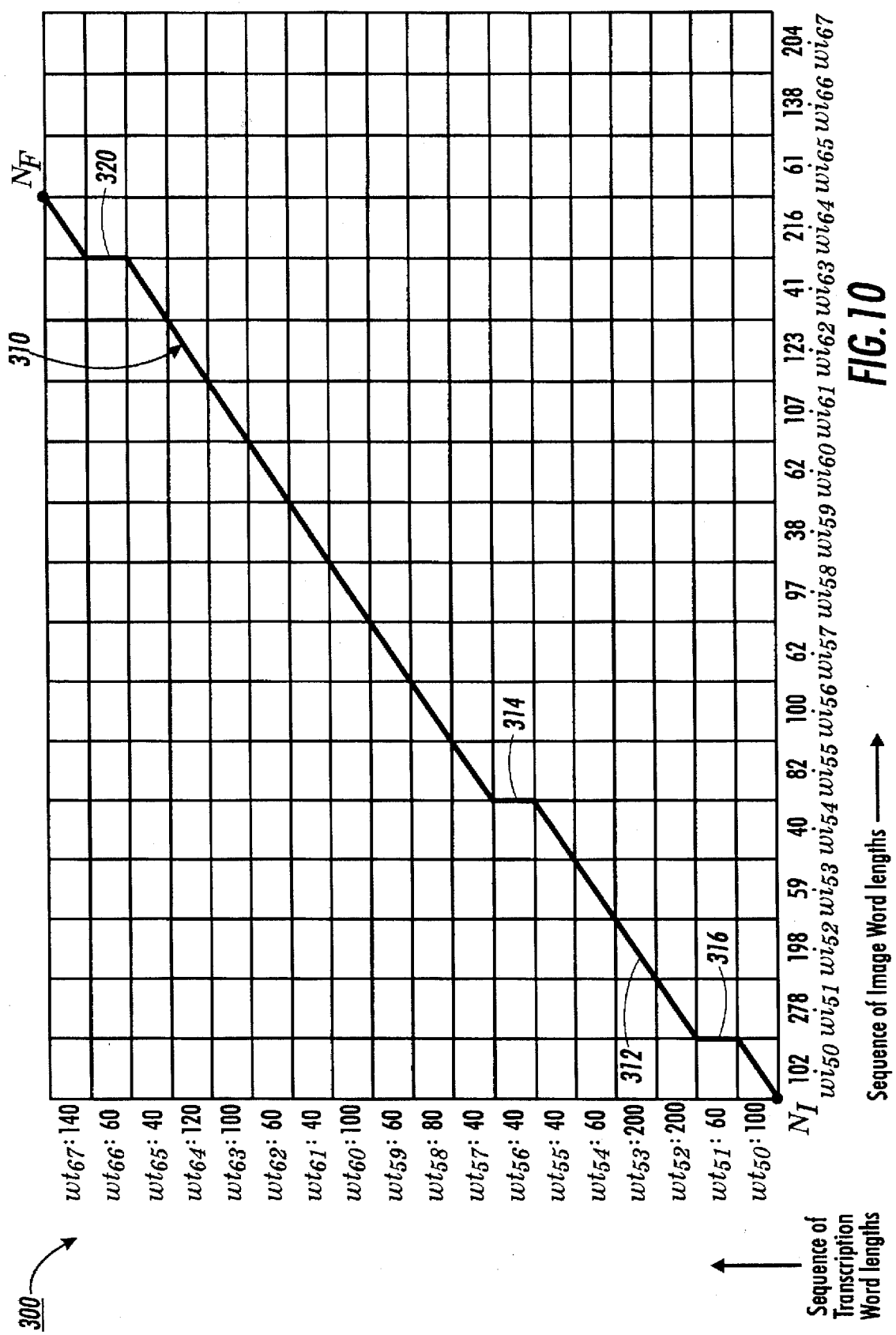
FIG. 10 illustrates a lattice structure used by the dynamic programming technique of the illustrated embodiment to align the image words to transcription words according to the invention, using selected portions of the image of FIG. 3 and the transcription of FIG. 4.

The description of an illustrated embodiment of the image-transcription alignment technique of the present invention utilizes text image 10 of FIG. 3 and transcription 60 of FIG. 4 as representative inputs. FIGS. 5 and 6 schematically illustrate examples of intermediate data structures produced by the technique, and FIGS. 7 and 8 show portions of the data structures in FIGS. 5 and 6 respectively that represent data produced from exemplary data structures 10 and 60 of FIGS. 3 and 4 respectively. FIG. 9 is a flow chart illustrating the sequence of steps implementing this embodiment of the present invention. FIG. 10 diagrammatically illustrates the results of the operation of a selected dynamic programming technique for performing the alignment between a selected sequence of image and transcription words. FIG. 11 schematically illustrates an example of a representative output alignment data structure produced by the illustrated embodiment, and FIG. 12 shows a portion of the output image-transcription alignment data structure, organized according to the data structure in FIG. 11, that represents data produced from the alignment operation of FIG. 9 performed on the selected data shown in FIG. 10.

The image-transcription alignment technique 200 of this illustrated embodiment establishes a relationship between portions of text image 10 that are designated as image words and portions of transcription 60 that are designated as transcription words by determining the locations and sequences of image words and transcription words in their respective data structures without any knowledge about the identity of the individual glyphs in the image words. Technique 200 does this by performing a word segmentation process on text image 10, estimating an image character width in pixels in text image 10, identifying words in the transcription, using the estimated image character width to determine transcription word lengths, determining observed image word lengths, and aligning transcription words to image words by lengths using a dynamic programming technique. Each of these processes will now be explained in more detail.

1. Analysis of the input text image to determine image words and image word parameters.

With reference to FIG. 9, image transcription alignment technique 200 of the present invention begins with receiving and storing input text image 10, in box 204, and receiving and storing transcription 60, in box 208. Then, in box 210, text image 10 is analyzed to identify image word boundaries and the pixel size (i.e., width along the image baseline) of the glyphs in the image. There are several conventional ways of identifying portions of text image 10 that correspond to image words. Most of these methods use conventional image processing techniques that involve determining connected components, and involve making and using an estimate of either inter-character distance or inter-word distance, or both. Several possible methods for finding word images are now briefly described.

a. Determining image words.

A first method for identifying word image locations in the input text image begins with identifying connected components at the character level. These identified connected components are then ordered, by image location in row-major order, by building lists in left-to-right fashion, with one list being created for each text line, in effect sorting the positions of the connected components from left to right. The list building process is somewhat simplified if the image is deskewed prior to list sorting, but prior deskewing is not essential. As each connected component in a text line is selected serially, a determination is made as to whether the connected component is to go to the right of a component in one of the already existing lists, or whether it is to start a new list. Because of the possibility that smaller connected components that occur at the beginning of a line, such as certain types of punctuation marks, may have an adverse effect on the sorting, the sorting of these smaller components may be deferred until the text line lists are created and then added to the appropriate lists. Once the connected components are sorted by line, a histogram is produced of the distances between the connected components. This histogram displays two major components: the first is the inter-character distance within a word and the second is the inter-word distance. Once these average distances are determined from the histogram data, each space between connected components can be labeled as either an inter-character space or an inter-word space, which results in segmenting the words. Alternatively, after determining these distances from the histogram data, a structuring element for a morphological closing operation can be determined that will join characters within a word but not between separate words. As a variation, the morphological closing may be combined with threshold reduction operations to find the segmented words at a reduced scale.

A second method for finding image words works with text lines in the input image. The image is first deskewed so that the text lines are aligned with the raster lines of the scanned image. Then, the approximate bounding boxes of the text lines are found as follows: the text lines are localized vertically by either performing a horizontal projection of the pixels, or by performing a morphological closing operation. The horizontal projection profile of the pixels is an array giving the number of pixels on each scan line. For aligned text lines, this projection will have large values within the text lines and very small values between the text lines, allowing vertical localization of the text lines. The morphological closing operation is done with large horizontal structuring elements and results in combining characters and words into one large connected component for the text line. This operation is followed by a large horizontal opening to break any connections between different text lines that could have been formed in the morphological closing operation, such as, for example, by descenders from one line being located close to ascenders in the line below. The result is a single connected component for each text line. Once the text lines have been located, the connected components within them are found and their positions are ordered from left to right, as previously describe, and a histogram is produced of the distances between the connected components. As noted above, the inter-character distance within a word and the inter-word distance is found from the histogram data, and spaces between connected components can be labeled as either inter-character spaces or inter-word spaces, which results in segmenting the words.

A third method involves producing a histogram of the horizontal run lengths of background pixel runs that provides information from which to estimate inter-word spacing. This method assumes that most short runs of background pixels in the input image are due to intra-character and inter-character spaces, while longer runs of background pixels are due to inter-word spacings. In addition, some variable-length longer sequences of background pixels are found between ascenders and between descenders, and very long sequences of background pixels are found between text lines. A page of text lines will have a characteristic signature to this histogram with a peak for sequences of background pixels that occur between words.

Locations of word images in the input text image can also be found using horizontal dilation or closing operations. The input image can be successively dilated with successively larger horizontal structuring elements. After each dilation operation, the number of connected components produced is counted. As the structuring element becomes large enough to close inter-character spacings, the number of connected components rapidly decreases, and at some size for the structuring elements, the number of connected components that are identified tends to remain nearly constant. Then, for successively larger dilations, the number of connected components again falls, although not so rapidly as previously, as inter-word spacings are closed. The sizes of the structuring elements where the number of connected components appear constant and where they change rapidly are accurate indications of inter-character and inter-word spacing, and can be used to choose a structuring element that joins characters within words but not words within lines. The locations of the connected components following such an operation are then found, and these locations indicate a segmentation of the words in each text line.

Still another word segmentation method is described in U.S. Pat. No. 5,321,770, entitled, *Method for Determining Boundaries of Words in Text*, issued to Huttenlocher et al. After determining the angle of orientation of text in the input image by using a deskewing operation, the angle orientation information is used to determine the toplines and baselines of the text so that upper and lower boundaries of lines of text within the image are identified. A function referred to as "blobify" is then performed which operates on the image so that each word group in a line may be isolated and subsequently treated as a single unit. The blobify function is the application of a median filter to a copy of the image which results in a filtered image that tends to render words into blobs distinguishable from one another in local areas. This process relies on the fact that the inter-character spacing in a word is generally smaller than the inter-word or inter-line spacing for the surrounding text image. Median filtering blurs or fills in the inter-character gap without overfilling the larger inter-word or inter-line gaps, with the result that a word becomes a single connected set of pixels. Additional white lines are added to the image approximately halfway between adjacent baseline and topline pair to ensure that there is no cross-text-line blobifying, such as might occur in an image of narrowly spaced text lines where descenders from one line are located in close proximity to ascenders in the line below. Finally, a bounding box is determined around each blobified word.

The end result of any of these image word analysis techniques is a set of image locations that identify the boundaries of words in text image 10. The image coordinates of the word boundaries are then ordered in the sequence they occur in text image 10 to produce an ordered sequence of the image word locations that identify words in text image 10. The order of image word locations in the sequence of image words follows the expected reading order for the text in image 10, which is also the order the words are expected to appear in the transcription.

b. Determining an estimated image character pixel length.

The alignment method in the illustrated embodiment is concerned with aligning the lengths of transcription words to the lengths of image words. Thus, an estimated image word length for each image word is also determined by computing actual, observed pixel lengths from identified word boundaries for each word. With respect to transcription word lengths, however, if advance information about the font and size of the glyphs in text image 10 is not otherwise available, transcription word lengths must be estimated using glyph measurements from text image 10. In addition, to achieve an accurate alignment, it is useful to know how many glyphs each image word is estimated to contain; image word lengths alone do not necessarily provide this information. Therefore, it is necessary to determine an image character width for the glyphs in text image 10. This can be accomplished using any one of several techniques.

One method for finding an estimated image character width involves computing the size of connected components in the image, or in a part of the image. These connected components will typically be individual characters, but they may also include multiple (touching) characters and parts of (broken) characters. The size of the connected components is computed by first forming two histograms: one displays the distribution of the lengths of the connected components; the other displays the distribution of the height of the bounding boxes of these connected components. The heights of the character images should have as an upper limit the distance from the top of the ascenders to the bottom of the descenders. Individual characters are not this tall, but a merged ascender and descender character would be. This histogram is expected to have a significant population at the x-height, and another significant population at the size of the d (ascender or uppercase character) or p (descender character). The x-height or ascender heights are useful as a normalization factor to estimate the widths of different characters. For example, for variable width fonts, the width and set width of each character can be typically estimated as some character dependent factor times the x-height for the entire font. For fixed width fonts, the set widths of all characters are equal. The width histogram typically has a large population around the width of single characters, which gives a direct measurement of this distribution. Touching characters give bounding boxes with greater widths, and the histogram will show these as wider components. These multiple character components can typically be eliminated because their width falls outside the widths of the majority of the connected components, and because the length-to-width ratio is too large for single characters. Thus one arrives at a distribution of widths for single characters, from which, by adding a small amount of inter-character spacing, it is possible to determine the estimated average width of an image character.

A second method for estimating image character widths begins with performing an image processing operation that merges characters together. A morphological closing operation is the simplest such operation, with the size of the structuring element being varied. The ideal result of the closing is that characters in words are joined but separate words are not joined. To avoid joining words in different lines, closing should be done using a horizontal structuring element. In practice, after such a closing, some, but not all, characters within each word will be joined; however, the fact that complete words may not be isolated does not matter for the purpose of estimating the character width. After completing the morphological closing operation, connected components are then found, and a histogram of their widths is then produced. Definite peaks in the histogram will be observed that correspond to one-, two-, three-, and four-character components. From these distributions, determining the relationship between the number of characters in a word and the estimated width of a character image in pixels is straightforward.

Another method for finding an estimated image character width uses information about the image words in a known portion of the image that are found using one of the techniques just described and uses the corresponding words in the transcription to identify the number of characters that should be included in the image words; the image word lengths can then be divided by the number of characters to arrive at an estimated average image character width. For example, the transcription may include line end information, such as new line character 62 in transcription 60 of FIG. 4. The sequence of lines in the transcription can be identified, and the number of characters that appear in a given transcription line can be counted. The width in pixels of a line in the text image that has been identified as corresponding to the given transcription line can then be determined, and this width can be divided by the count of the characters in the transcription line to produce an estimated average image character width and an estimated inter-word spacing width.

FIG. 5 illustrates image word data structure 20 (FIG. 2) which is produced as the output of image analysis function 210 in the illustrated embodiment. Data structure 20 includes image word parameters 22 and array 30 of image words, $w_i$, organized in image word order sequence by data item 32. Image parameters 22 include an estimated average character width 24 and an estimated inter-word spacing measurement 26. For each image word $w_i$, identified in array 30, an image word location 34, designated as $(x, y)(w_i)$, and an image word length 36, designated as $l_i,(w_i)$, are stored. The alignment operation may also be performed using additional image word parameters; the presence or measurement of ascenders or descenders in an image word, for example, may be used in addition to image word length. This additional image word parameter information may be stored in array 30 as well, as illustrated in FIG. 5.

FIG. 7 illustrates image word array 400, showing the results of image analysis function 210 performed on text image 10 (FIG. 3) for two portions of text image 10. The English language words from text image 10 that appear in image word array 400 are solely for purposes of illustrating the results of the image word segmentation process, and are otherwise unknown to the image analysis function. Array 30 entries for what have been identified as image words $w_{i_{50}}$ through $w_{i_{67}}$ in text image 10 are delineated in text image 10 by box 12. Image analysis function 210 identified what appear as two words "is" and "so" in text image 10, called out as reference number 16 in FIG. 3, as one image word entry 408 in image word array 400, having image coordinate location 412 and image word length 416 as shown. Image word lengths shown in FIG. 7 are observed image word lengths measuring the image words as found by the word segmentation process. Though not explicitly shown in FIG. 7, a value of 20 pixels will be used for image word parameter 24, the estimated average character width of glyphs in image 10, for purposes of the illustrated embodiment.

2. Analysis of the input transcription to determine transcription words and transcription word parameters With reference again to FIG. 9, a transcription word analysis function is performed in box 220 to identify the location and length of transcription words. Transcription word analysis function 220 requires that groupings of character codes that correspond to words in a given input transcription be separated from each other by some type of transcription word boundary character code, which typically means that a transcription simply include conventional inter-word spacing. Identifying the sequence of transcription words and their location in the transcription is then a straightforward process of identifying the transcription word boundary character codes. A count of the number of character codes in each word is used to produce a transcription word length for each transcription word using the image character width computed from the text image, or from direct information about the image character size that is available from another source. Transcription word analysis function 220 produces transcription word data structure 80, an example of which is illustrated in FIG. 6, in which $w_t$ designates a transcription word, $loc_t$ designates a transcription word location, and $l_t(w_t)$ designates a transcription word length. Transcription word data structure 80 is organized in transcription word sequence order by data item 82 and includes transcription word location 84 and transcription word length 86. Transcription word data structure 80 may optionally include other transcription word parameters 88 that may be used in the alignment process.

FIG. 8 illustrates transcription word data structure 460, showing the results of transcription word analysis function 220 performed on transcription 60 (FIG. 4) for two portions of transcription 60. The English language words from transcription 60 that appear in transcription word data structure 460 are provided for purposes of illustrating the results of the transcription word analysis process, and may, but need not, be included in the data structure. Transcription word data structure 460 includes data item 464 that identifies the sequence of the transcription word in transcription 60; data item 466 which identifies a transcription word location in transcription 60 of the transcription word identified by the entry; and data item 68 indicating a transcription word length for the transcription word identified by the entry. Transcription word lengths have been computed using a value of 20 pixels, as determined for the estimated average character width parameter 24 (FIG. 5) for glyphs in image 10. Transcription word data structure 460 includes entries for what have been identified as transcription words $w_{t_{50}}$ through $w_{t_{67}}$ in transcription 60, which are delineated in transcription 60 by box 64.

It has already been noted that transcription 60 is an errorful transcription, and it can be seen that some of these errors have an effect on word identification. Transcription word analysis function 220 identified two words, $w_{t_{51}}$ ("pre") and $w_{t_{52}}$ ("litigation"), called out in FIG. 8 as data structure entries 472 and 474, for what appears as one word "prelitigation" in text image 10; this is a result of substitution error 76, where a "space" character has been substituted for the hyphen that actually appears in that word. Similarly, transcription 60 contains substitution error 70, where a "space" character has been substituted for the character "i". This results in the transcription word analysis function 220 identifying two words, $w_{t_{66}}$ ("lit") and $w_{t_{67}}$ ("gation") for what appears as one word in text image 10, and storing two entries 486 and 488 in transcription word data structure 460. It can also be seen transcription 60 provides correct transcription labels for consecutive image words 16 (FIG. 3) "is" and "so," and transcription word analysis function 220 correctly produced two data structure entries 478 and 480. It can be seen that transcription error 68 in FIG. 4 is a combination of deletion and substitution errors; data structure entry 484 in transcription word data structure 460 reflects this error in its length, which corresponding image from the length computed for the corresponding image word "often" in text image 10.

3. Mathematical details of the alignment technique

The illustrated embodiment of the image-transcription alignment technique of the present invention uses a dynamic programming operation to match, or align, a given observation sequence of transcription words with a given observation sequence of image words, where each component word of each sequence is expressed in terms of the geometric attribute of pixel length, and where the restriction is imposed that pairs of matched words must maintain their original order within their respective sequences. As described previously, the representation of the two word sequences is a two-dimensional lattice structure of nodes, with a connecting transition between each pair of nodes in the lattice; the transition indicates a pair of words. The matching or alignment process expressed as a dynamic programming problem involves finding a best transition sequence from an initial node, i.e., the beginning of both word sequences, in the two-dimensional lattice structure to a final node that produces an optimum cumulative score, where a score is assigned to a transition, and a cumulative score is assigned to a node on the basis of the path of transitions taken to reach that node. One possible scoring mechanism assigns a penalty (i.e., decreases the score) at a transition where an insertion, deletion or substitution is detected, and where there is a difference between image word and transcription word lengths. The best path is one which has the minimum penalty, and therefore maximizes the accumulated scores for each node.

The mathematical algorithm requires a score that is computed recursively from previous points in the lattice as processing proceeds across the lattice from the beginning point to the end point. For any lattice point (i,j), compute the Score(i, j) as $$\text{Score}(i,j) = \text{Max}\{\text{Score}(i-1,j-1) + sim(i-1,j-1,i,j), \quad (1)$$
$$\text{Score}(i-1,j) + sim(i-1,j,i,j),$$
$$\text{Score}(i,j-1) + sim(i,j-1,i,j)\}$$

where the first argument to Max{} represents the diagonal transition in the lattice, indicating a word match or a word substitution; the second argument is the vertical transition, indicating the insertion of a transcription word; and the third argument represents the horizontal transition, indicating the deletion of a transcription word.

The sim values measure the similarity of the image and transcription word lengths, and are larger for good matches. The sim value sim(i−1, j−1, i, j) is the similarity between the transcription word wt that begins at i−1 and ends at i, and the image word wi that begins at j−1 and ends at j, This similarity can be expressed as $$sim(wt, wi) = \frac{-((lt(wt) - li(wi))^2}{\sigma} \quad (2)$$

where the two length functions are:

lt(wt)=estimated length, when rendered in pixels, of transcription word wt, as computed from the characters in the word and the estimated size of the font;

li(wi)=actual length in pixels of image word wi, and $\sigma$ is a constant that sets the scale of this function. The transcription word insertion and deletion sim values, sim(i−1, j, i, j) and sim(i, j−1, i, j), are defined analogously, but with the image word wi or transcription word wt, respectively, taken to have length zero.

In the example of equation (2), the difference in lengths is raised to a power of 2. The exponent can take on many values; what is significant is that the sim function must only depend on the absolute value of the length differences. The quadratic function penalizes small differences relatively little; the point at which length differences begin to adversely affect the score depends on $\sigma$.

Other measures of similarity can be used. It is only necessary that a similarity measure have a monotonic relation to the difference in lengths. For example, the similarity between a transcription word wt and an image word wi may be expressed as $$\frac{1}{(\alpha + \text{Abs}((lt(wt) - li(wi))^\beta)} \quad (3)$$

where $\alpha$ is a constant that produces an upper bound on the similarity and $\beta$ is an exponent that controls the rate at which the similarity decreases as the length difference increases. A large value of $\beta$ weights small differences with a relatively smaller penalty.

When applied to vertical or horizontal transitions, where either the image word or the transcription word is deleted, the length of the deleted word can be assumed to be 0 in the above formulas. The parameters in the sim function may be selected such that the path on the diagonal will always have a larger score than the sum of the two paths where either an image word or a transcription word is inserted and then deleted.

The best path can also be found as a minimum score, if the score is designed as a penalty. In this case, the contribution from each transition might be a dissimilarity measure rather than a similarity measure, expressed as $$dissim(wt, wi) = -sim(wt, wi) \quad (4)$$

and the score is found by taking $$\text{Score}(i,j) = \text{Min}\{\text{Score}(i-1, j-1) + \text{dissim}(i-1, j-1, i, j), \\ \text{Score}(i-1, j) + \text{dissim}(i-1, j, i, j), \\ \text{Score}(i, j-1) + \text{dissim}(i, j-1, i, j)\} \quad (5)$$

A simple function that can be used for computing the dissimilarity between transcription and image word lengths is $$Abs\ ((li(wi)-lt(wt)^\beta \quad (6)$$

where β is an exponent that controls the rate at which the dissimilarity measure increases as the length difference increases. Using a large value for β gives relatively smaller penalties to small differences in length.

It can be seen, then, that the scoring mechanism for assigning penalties to differences between the image word and transcription word lengths may be adjusted to weigh certain length differences more than others. As illustrated above, a scoring design that depended on the absolute value of the difference between word lengths would, in the initial steps or depending on the approximations used to predict the transcription word lengths in pixels, make small systematic errors in the similarity measures, even when the image length and word length are correctly aligned. Consequently, a scoring system that is tolerant of such small differences between image and transcription word lengths, which are realistically expected to occur, should lead to more accurate alignment results. To accommodate this, the score could be computed as a power of the difference, as shown for example in equation (2) which would tend to penalize larger deviations more than smaller ones; adjusting the exponent upward places even more weight on larger deviations. In addition, use of a larger exponent can reduce the accumulation of systematic errors during the first few iterations when an estimate of the image character width parameter may be inaccurate and consequently cause scoring errors when matching words that are actually correctly aligned.

While the alignment process of the illustrated embodiment is described with respect to aligning image and transcription words and optimizing a similarity measure between their respective word lengths, other types of alignments between the transcription and the image may be implemented using appropriate similarity measures. For example, at the level of image and transcription characters, a transcription character label in a sequence of labels could be used to retrieve a character template image from a stored set of character templates for the character set used in the image, and the character template image could then be aligned to an image region in a sequence of image regions, each of which has been previously identified as a character in the image. The sire function for an appropriate scoring mechanism for this type of comparison might then be a function of pixel color values, rather than a geometric measurement of the image and transcription regions.

At each lattice node, the optimum cumulative score (e.g. the maximum score of equation (1) or the minimum score of equation (5)) is stored together with the transition, or direction, that was used in the optimizing function to give the largest score. The stored transition information is used for backtracking through the lattice from the end node to the beginning node to determine the best path, after the score has been computed at all possible nodes.

4. An illustration of the operation of the dynamic programming alignment technique on selected input data.

Implementation of image-transcription word alignment technique 240 (FIG. 9) is discussed with reference to FIG. 10. Each observation sequence of word lengths is placed along an axis (e.g., the x and y axes), with the beginning of each sequence at the origin. This defines a two dimensional lattice structure 300 of states or nodes occurring at the intersections of word lengths having a common sequential position in each sequence of word lengths. The word alignment process finds the best sequence of nodes, or best path, through the nodes of the lattice from the beginning of the word length sequences, at the origin of the two dimensional lattice, designated as $N_I$ in FIG. 10, to the end of the word length sequence, a point in the x,y plane with coordinates corresponding to the endpoints of both word length sequences, designated as $N_F$ in FIG. 10. The best path is found given the constraint that the path can only move in steps to the right, diagonally to the upper right, or up in the lattice; this constraint implements the restriction of maintaining original word order within each sequence of word lengths. The best path optimizes the sum of the scores along each path segment, according to the scoring technique used.

With reference again to FIG. 9, once a total score has been computed for a best path through the lattice structure, the score can be tested against a threshold, in box 260, to determine if the alignment of the transcription words to the image words meets an acceptability criterion. If the score is not acceptable, processing proceeds to the inquiry in box 264 which tests whether a better alignment score is likely to be achieved by re-estimating image and transcription word parameters and iterating the alignment process again, using the new word parameters. The tests in boxes 260 and 264 reflect the fact that the selection and design of the scoring mechanism permits advance knowledge of a scoring level that indicates first, whether the alignment score is good enough to indicate that a successful alignment between image and transcription words has been achieved, and secondly, if the current alignment score is not good enough, whether the alignment of the two word length sequences is likely to be successful with further iterations. This second inquiry realistically takes into account the substantial uncertainties associated with the accuracy level of the transcription and the noise level of the input text image. If the current alignment score does not meet the threshold test in box 264, processing of alignment technique 200 is stopped. Thus, the image-transcription word alignment technique of the present invention can provide useful information about the quality of one or both of the two inputs in the relatively short time it takes to produce the intermediate data structures 20 and 80 and to perform a single iteration of the alignment process 240.

Note that the threshold test in box 264 is an optional test that need not be implemented for the alignment technique of the present invention to work satisfactorily, and, if implemented, the threshold test in box 264 need not be tested after each alignment iteration. The threshold text in box 260 may be implemented to also test for a maximum number of iterations in addition to testing whether the alignment score meets a certain threshold, and to stop if the maximum number of iterations is met prior to the current alignment score meeting the threshold tested in box 260.

Note also that the threshold test in box 264 may be implemented in a manner that also determines whether the current scoring mechanism that is being used is satisfactory for the observed sequence of image word and transcription word data. As previously described, a variety of node scoring mechanisms may be implemented to place penalties on certain types of deviations more than on others, and to take into account the specific circumstances of certain images and transcriptions. The threshold test in box 264 may be implemented in a manner that effectively evaluates whether the scoring mechanism is appropriate for the observed data sequences, and to change the scoring mechanism based on an evaluation of the stored scores for the just-completed alignment process.

If the current alignment score does meet the threshold test in box 264, processing of alignment technique 200 continues to box 270 where image word and transcription word parameters are recomputed using the stored results of the just-completed alignment process. Since scores are stored for each node in lattice structure 300 as a path through lattice structure 300 is produced, scores evaluated to be "good" scores according to the current scoring mechanism are likely to indicate successful matches between specific transcription words and image words in the observed sequences. For example, as described below in the description of the path illustrated in FIG. 10, a diagonal line in the path indicates a successful match between an image word and a transcription word. Each successful match identified this way will provide information about the number and identity of characters in the matched transcription word and the number of pixels in the length of the matched image words. This information permits re-estimation of image character width and inter-word spacing. In addition, there may be sufficient information in the word alignment data of the just-completed alignment from which to compute estimates of image character widths for specific individual characters, which may then be used to improve transcription word lengths for those transcription words including those characters prior to the next iteration.

Processing then transfers to box 210 where the sequence of image word locations and word lengths may be recomputed, using the new estimated image character width (s), and a revised estimate for inter-word spacing. Similarly, the transcription word lengths for all words in the transcription can be recomputed prior to the next iteration of alignment process 240.

If the current alignment score meets the threshold test in box 260, a best path through lattice structure 300, and consequently a best alignment between the image and transcription words, has been found, and processing proceeds to box 280 where a backtracing operation is performed through the stored nodes of the best path to identify which transcription words in the transcription word sequence matched which image words in the image word sequence. This information, along with transcription word locations from data structure 80 of FIG. 6 and image word locations from data structure 30 of FIG. 5, are stored in the output image-transcription word alignment data structure 90, an example of which is illustrated in FIG. 11. Data structure 90 includes transcription word location 94 and image word location 96. Data structure 90 may also include a data item (not shown) that indicates the number of glyphs that are estimated to be included in each image word, which can be computed from dividing the image word length (as observed and measured from the image) by the most recently estimated image character width parameter value.

FIG. 10 shows an example of a completed path 310 for the selected sequence of transcription word lengths and image word lengths shown along the axes of lattice structure 300. Note that in FIG. 10, the transcription and image word lengths are denoted as $w_t$ and $w_i$, respectively, to conserve space. The sequence of these word lengths are taken from the data structures illustrated in FIGS. 7 and 8. In path 310, a diagonal line 312 illustrates a match between the image word length (for $w_{i_{52}}$) on the x axis and the transcription word length (for $w_{t_{52}}$) on the y axis at this location in the lattice structure. Vertical lines 314, 316 and 320 illustrate for the deletion of transcription words from the matching process; that is, alignment process 240 determined that matching image word lengths could not be found in the image word length sequence for transcription word lengths $w_{t_{52}}$, $w_{t_{54}}$ and $w_{t_{56}}$. Although none are shown, a horizontal line in path 310 would illustrate the deletion of an image word from the matching process, whereby alignment process 240 determined that a matching transcription word length could not be found in the transcription word length sequence for a particular image word length. The local details of the alignment process exposes problem areas in the image or transcription, or both. This information may be useful in a subsequent operation that makes use of the output data structure of technique 200 to indicate that these locations in text image 10 or these portions of transcription 60 are unreliable.

FIG. 12 illustrates a portion of an example of an output data structure 500 that may be produced as a result of completing image-transcription alignment technique 200 for the selected data illustrated in FIG. 10. Entry 504 shows that a transcription location for transcription word $w_{t_{50}}$ is paired with an image word location in text image 10 for the matching word $w_{i_{50}}$ in path 310. Entries 508 and 510 show that no image locations have been paired with these transcription words, on the basis of the matching results shown in path 310. Note that entry 512 shows that a transcription location for transcription word $w_{t_{57}}$ ("so") has been paired with an image word location in text image 10 for word $w_{i_{55}}$ ("isso").

Image-transcription alignment of the type just illustrated may be carried out using the entire sequence of image and transcription words for an image page, or it may be carried out using convenient portions of one or the other of the two inputs, if information is available with respect to the initial alignment of these input portions. For example, if the transcription has paragraph identification information, and image analysis techniques may be reliably applied to the input image to identify image locations of paragraphs, then alignment may be carried out on a paragraph by paragraph basis. The selected portions of text image 10 and transcription 60 used in FIG. 10 were selected for illustration purposes; typically, the alignment will be performed over a larger portion of the inputs, particularly when no intermediate a priori alignment information about the two inputs is readily available. When smaller portions of the image and transcription are used, such as paragraphs, if the alignment scores show that an accurate alignment between a particular image paragraph and transcription paragraph is unlikely, suggesting, for example, that the transcription is particularly errorful with respect to the selected image region, the alignment can be retried using a larger portion of both inputs.

D. Additional considerations

1. Improving the transcription word lengths, and detecting image font information The accuracy of transcription word lengths is a function of the accuracy of the image character width parameter that is estimated from an analysis of the input text image. Improvements in the accuracy of the image character width, and consequently transcription word lengths, may be able to be made by estimating a character width for each character in the image character set, instead of using a single estimated character width for all characters. This can be done directly if the transcription provides font identity information and font description data is available from which to derive an actual or estimated width of each character in the font.

Alternatively, generally known information about font design may be used to estimate individual character widths.

Many fonts are designed to have the property that the width in pixels of individual characters in the font is proportional to the pixel height (perpendicular to the image baseline) of a lowercase character that has neither an ascender or descender; in English and many other Roman alphabet languages, such a lowercase character is "x," and the pixel height is referred to as the x-height of the font. Thus, knowledge of the x-height and a reasonable guess of the factors to use to relate the image x-height to the widths of individual characters can be used to estimate an image character width for each character in the image character set. A glyph representing the character "x" or any lowercase letter can be located in the input text image by examining the image word lengths and assuming that the smallest image word length represents a single character word. Analyzing the pixel configurations of the single character words will determine which is a suitable lowercase letter.

Using the estimated image x-height parameter, a table of individual image character widths by character code can be constructed using estimates of a reasonable set of proportionality factors. These, in turn, can then be used to determine transcription word lengths. The table of individual character widths can either be constructed using the assumption that the font in which the image glyphs appear is a fixed width font, or using the assumption that the font is a variable width font.

If the application in which the alignment technique of the present invention is used would benefit from having specific font information about the font in which the image glyphs appear, an additional operation can be included that estimates whether the font is a fixed width or variable width font. A table of individual character widths can be constructed, using the image x-height parameter and a reasonable set of proportionality factors. Then, a first iteration of the alignment process can be performed twice—once using transcription word lengths computed using estimated fixed width font character width information, and once using transcription word lengths computed using the variable width font character width information—and the results of the two alignment operations can be compared. Analysis of the overall score and local details about each of the matches would provide information as to whether the glyphs in the input image appear in a variable- or fixed-width font.

2. Estimating image character widths for individual characters in the image character set from alignment results.

In the case where an estimated average image character width is used for all characters throughout the alignment operation, it may be useful for a subsequent operation that uses the result of the alignment operation to have estimates of the image character widths for individual glyphs in the input image. At the completion of the image-transcription alignment, local details about specific successful transcription word and image word matches (i.e., where the scores indicates that the length matches are good) may provide sufficient information from which to compute these individual image character widths using a least squares estimation procedure. In particular, if there are N words having m different characters, performing a least squares error solution to N equations in m unknowns will yield the values of the widths of the m characters, where N>m (and where typically N>>m.)

3. Improving robustness to segmentation errors

The dynamic programming procedure described above does not explicitly allow for errors that may occur in the segmentation of the image into image word locations in image analysis function 210 or that may occur in the segmentation of the transcription into transcription word locations in transcription analysis function 220. Such a segmentation error will be handled as a combination of a deletion error and a substitution error. For example, image analysis function 210 in the illustrated example failed to separate the words "is" and "so", resulting in the incorrect image word "isso" 408 (FIG. 7). This results in the dynamic programming procedure not aligning any image word with transcription word $wt_{56}$ ("is"), and aligning image word $wi_{55}$ ("isso") with transcription word $wt_{57}$ ("so"), as shown by entries 510 and 512 in FIG. 12.

A better result would be to align $wi_{55}$ ("isso") with the combination of $wt_{56}$ ("is") $wt_{57}$ ("so"), by explicitly handling segmentation errors. The dynamic programming procedure can be modified to do this, as follows. The dynamic programming recursion step expressed in equation (1) is modified to allow paths into node (i,j) that represent failing to segment two image words (or equivalently, falsely segmenting a single transcription word into two words) and/or falsely segmenting a single image word into two words (or equivalently, failing to segment two transcription words). For example, single segmentation errors can be handled by $$\text{Score}(i,j) = \text{Max}\{\text{Score}(i-1,j-1) + sim(i-1,j-1,i,j), \quad (7)$$
$$\text{Score}(i-1,j) + sim(i-1,j,i,j),$$
$$\text{Score}(i,j-1) + sim(i,j-1,i,j),$$
$$\text{Score}(i-2,j-1) + sim(i-2,j-1,i,j),$$
$$\text{Score}(i-1,j-2) + sim(i-1,j-2,i,j)\}$$

where the fourth argument to Max{} indicates an alignment of one image word with two transcription words, resulting from a failure to segment the image word into two words, or resulting from a false segmentation of the transcription words, and the fifth argument to Max{} indicates the alignment of two image words with one transcription word, resulting from a false segmentation of the image words or a failure to segment a single transcription word into two transcription words. The similarity score $sim(i-k,j-m,i,j)$ is now defined as the similarity of the length of the transcription word sequence beginning with the word following $wt_{i-k}$ and ending with $wt_i$, and the length of the image word sequence beginning with the word following $wi_{j-m}$ and ending with $wi_j$; the length of a sequence of words is the sum of the lengths of the words in the sequence, and the respective sequence length is taken to be zero if k=0 or m=0.

Multiple segmentation errors can be handled by searching even further back in the dynamic programming recursion; for single or double segmentation errors equation (1) becomes $$\text{Score}(i,j) = \text{Max}\{\text{Score}(i-1,j-1) + sim(i-1,j-1,i,j), \quad (8)$$
$$\text{Score}(i-1,j) + sim(i-1,j,i,j),$$
$$\text{Score}(i,j-1) + sim(i,j-1,i,j),$$
$$\text{Score}(i-2,j-1) + sim(i-2,j-1,i,j),$$
$$\text{Score}(i-1,j-2) + sim(i-1,j-2,i,j),$$
$$\text{Score}(i-3,j-1) + sim(i-3,j-1,i,j),$$
$$\text{Score}(i-1,j-3) + sim(i-1,j-3,i,j),$$
$$\text{Score}(i-2,j-2) + sim(i-2,j-2,i,j)\}$$

Similar modifications can be made to equation (5) when dissimilarity scores are computed.

To obtain the best alignment in the face of the various types of errors that can occur, the similarity measure should have certain properties. For example, a perfect match of transcription word $wt_k$ and image word $wi_j$ followed by an insertion of transcription word $wt_{k+1}$ should have a higher similarity score than the imperfect match of image word $wi_j$ with the combination of transcription words $wt_k$ and $wt_{k+1}$, and vice-versa for image word insertions; this ensures that true insertions and deletions will be correctly identified in the alignment.

With the above modification allowing the dynamic programming procedure to align across segmentation errors, it may prove advantageous in some situations to intentionally over-segment the image words. That is, by biasing the image analysis toward finding image word boundaries wherever possible, it will be very likely that at least all the true image word boundaries will be found. The additional false image word boundaries that will also probably be found will be detected as false segmentations when the dynamic programming operation is implemented as just described using equations (7) or (8) and so will not be substantially harmful to the ultimate alignment result. Such a bias may well improve the overall alignment by preventing substantial errors in image regions where it would otherwise be difficult to find the true word boundaries. It is noted, however, that over-segmentation may not be appropriate in all circumstances, and that there may be some circumstances in which it may prove advantageous to intentionally under-segment the image words instead.

E. The machine environment

Figure 13:
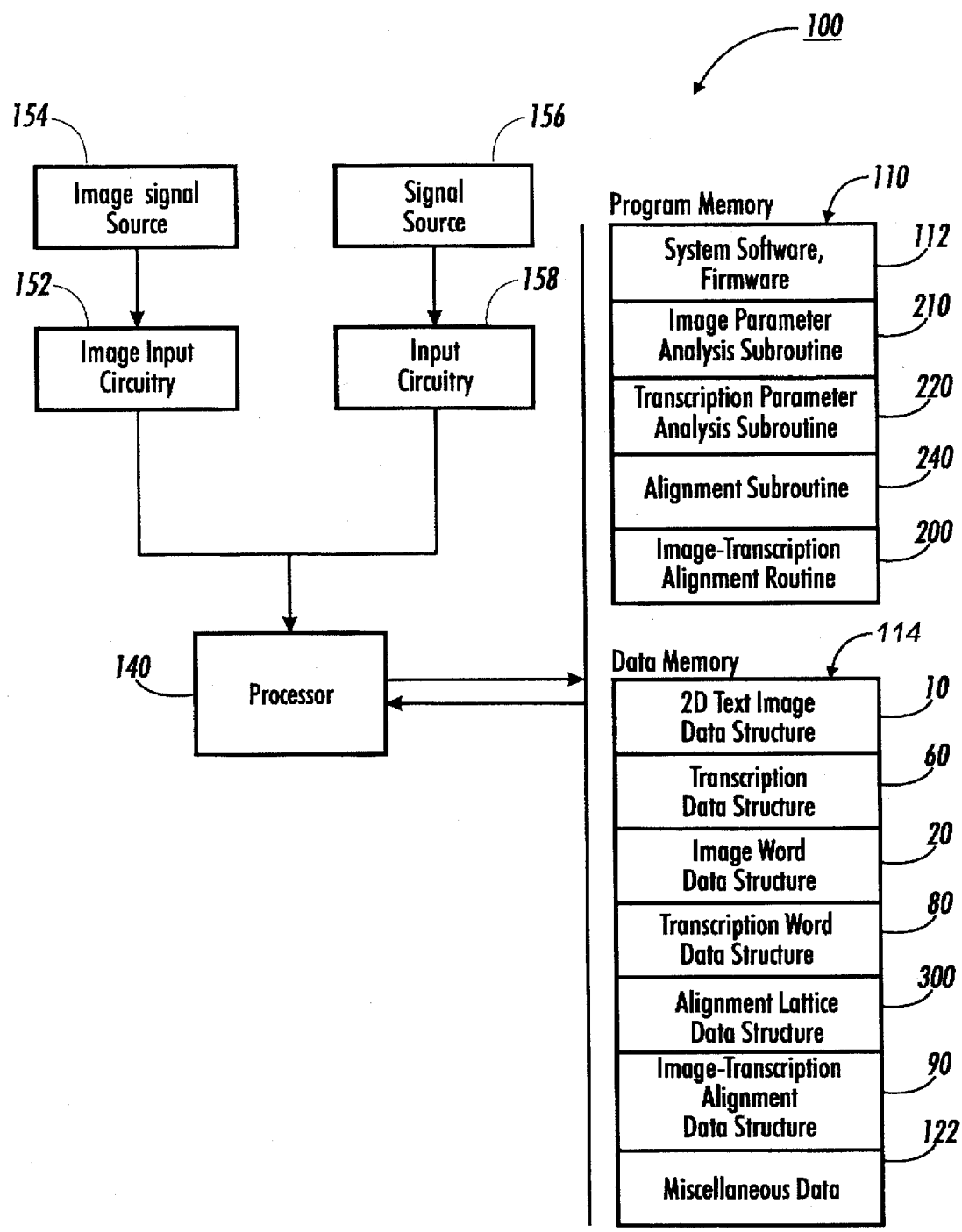
FIG. 13 is a simplified block diagram illustrating a machine that the method of the present invention may operate.

FIG. 13 shows the components of processor-controlled machine 100 implementing the features described above for aligning a text image and a transcription associated with the image. Machine 100 includes processor 140, which could be any processor, including one or more CPUs, and may include specialized hardware such as one or more coprocessors to provide specific functions. Processor 140 is connected for receiving image definition data defining images from image input circuitry 152. Input circuitry 152 is connected for receiving signals indicating image data from an image signal source 154. Image signal source 154 may include an optical scanner, a copier machine scanner, a Braille reading machine scanner, a bitmap workstation, or any similar signal source capable of providing image signals of the type required by the present invention. In the case of one of the scanners, the output of a sensor associated with the scanner is digitized to produce an image definition data structure defining an input image, and the image definition data structure is then provided to processor 140 via image input circuitry 152 for storage in data memory 114.

Processor 140 is also connected for receiving signals from input circuitry 158 connected to signal source 156 that provides signals indicating transcription data structure 60 (FIG. 4) to machine 100. Signal source 156 may include any signal-producing source that produces signals of the type needed by the present invention. Such sources include input devices controllable by a human user that produce signals in response to actions by the user, such as a keyboard device. Alternatively, signal source 156 may be an operation (not shown) that processor 140 is executing, or that is being executed by another processor in communication with processor 140, that provides transcription data structure 60 to processor 140 for processing according to the present invention. An example of such an operation is a character recognition operation performed on text image 10 that produces transcription data structure 60 as its output. Processor 140 then provides transcription data structure 60 to data memory 114 for storage.

Processor 140 is also connected for accessing program memory 110 and data memory 114 to obtain data stored therein. Processor 140 of machine 100 operates by accessing program memory 110 to retrieve instructions, which it then executes. Program memory 110 includes the underlying system software and firmware 112 that provide the operating system and operating facilities of machine 100, and image-transcription alignment routine 200 that implements the invention described in the flowchart of FIG. 9. Depending on the particular implementation of image-transcription alignment routine 200, program memory 110 may also include image word parameter analysis subroutine 210, transcription word parameter analysis subroutine 220 and alignment subroutine 240. During execution of the instructions in program memory 110, processor 140 accesses data memory 114 to obtain data items in transcription data structure 60 and text image 10, and to write image word parameter data 20, transcription word parameter data 80 and image-transcription alignment data 90 to memory 114. Data memory 114 also stores other data, such as the data structure for implementing alignment lattice 300 of FIG. 10. Miscellaneous data 122 includes other data used in executing instructions in program memory 110, and may include initial values, indexes for use in accessing the various data structures and the data structure used to store the alignment scores.

The actual manner in which the physical components of machine 100 are connected may vary, and may include hardwired physical connections between some or all of the components as well as connections over wired or wireless communications facilities, such as through remote or local communications networks and infrared and radio connections. Image signal source 154 and image input circuitry 152, for example, may be physically included in a single physical unit such as a scanning device that is part of a device such as a facsimile machine, that produces text image 10 and transmits it for receipt by processor 140. Or, either or both memory 110 or 114 may include memory that is physically connected to processor 140 as local memory, or that is remotely accessible to processor 140 by means of a wired or wireless communications facility. It is further of importance to note that the range of the physical size of machine 100, or of any of its components, may vary considerably from a large device, for example, a multi-featured high volume copier/duplicator device, to much smaller desktop, laptop, and pocket-sized or smaller display devices. The image-transcription alignment technique of the present invention is operable on all machines in this physical size range.

While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A method of operating a machine to align image words in a text image to transcription words in a transcription associated with the text image; the machine including a processor and a memory device for storing data; the data stored in the memory device including instruction data the processor executes to operate the machine; the processor being connected to the memory device for accessing the data stored therein; the method comprising:

operating the processor to obtain an image definition data structure defining a text image including a plurality of glyphs representing characters in an image character set;

operating the processor to obtain a transcription data structure associated with the text image and including a plurality of transcription labels indicating character codes representing characters in the image character set;

operating the processor to produce an ordered image word sequence of image words occurring in the text image; each image word being an image region in the text image including at least one glyph;

operating the processor to produce an ordered transcription word sequence of transcription words occurring in the transcription data structure; each transcription word being a sequence of at least one transcription label indicating a character code in the image character set; and operating the processor to perform an alignment operation to align image words in the ordered image word sequence with transcription words in the ordered transcription word sequence subject to a constraint of maintaining word order in each of the ordered transcription word sequence and the ordered image word sequence during alignment; the alignment operation producing an image-transcription alignment data structure indicating each image word in the ordered image word sequence paired with either no (a null) transcription word or with at most one transcription word in the ordered transcription word sequence.

2. The method of operating a machine of claim 1 wherein operating the processor to produce the ordered image word sequence of image words occurring in the text image includes determining an image word length value for each image word in the ordered image word sequence;

operating the processor to produce the ordered transcription word sequence of transcription words occurring in the transcription data structure includes producing a transcription word length value for each transcription word in the ordered transcription word sequence; and the alignment operation aligns transcription words in the ordered transcription word sequence with image words in the ordered image word sequence by matching image word lengths to transcription word lengths.

3. The method of operating a machine of claim 2 further including operating the processor to determine an image character width value indicating an estimated character width of a glyph in the text image; and wherein the transcription word length value produced for each transcription word in the ordered transcription word sequence is produced using the image character width value.

4. The method of operating a machine of claim 1 wherein, when the text image includes a first image word and the transcription data structure, when visually inspected and compared with the text image, does not include transcription labels visually paired with the first image word thereby indicating a missing transcription word, the alignment operation detects the missing transcription word; the alignment operation indicating in the image-transcription alignment data structure that the first image word is paired with no (a null) transcription word.

5. The method of operating a machine of claim 1 wherein operating the processor to produce the ordered image word sequence of image words occurring in the text image includes determining an image word parameter for each image word in the ordered image word sequence;

wherein operating the processor to produce the ordered transcription word sequence of transcription words occurring in the transcription data structure includes producing a transcription word parameter for each transcription word in the ordered transcription word sequence; and wherein the alignment operation uses similarity measurements between the image word parameters and the transcription word parameters to perform the alignment.

6. The method of operating a machine of claim 1 wherein the transcription data structure includes a transcription label error causing the processor to identify a sequence of transcription labels as a transcription word, referred to as an errorful transcription word, in the ordered transcription word sequence that cannot be identically matched to an image word in the text image by visual inspection of the text image; the errorful transcription word including at least one of a transcription label deletion, a transcription label substitution, or a transcription label insertion; and the alignment operation, when pairing image words in the ordered image word sequence to transcription words in the ordered transcription word sequence including the errorful transcription word, determines whether the errorful transcription word can be paired with an image word in the ordered image word sequence and if so, determines with which image word to pair the errorful transcription word.

7. The method of operating a machine of claim 1 wherein the alignment operation is implemented as a dynamic programming operation that represents the ordered transcription word sequence and the ordered image word sequence as a two-dimensional lattice data structure, hereafter referred to as a lattice, including a plurality of nodes and transitions between nodes; a transition between two nodes representing a pair of sequences of zero or more image words in the ordered image word sequence and zero or more transcription words in the ordered transcription word sequence; the dynamic programming operation producing a path through the nodes in the lattice from a first node to a final node using scores computed for nodes and computed for transitions between nodes in the lattice; a score for a transition indicating a similarity measurement between the zero or more transcription words and the zero or more image words associated with the transition; the dynamic programming operation storing node identification information for each node and transition in the path, as the path through the lattice is produced; and the alignment operation produces the image-transcription alignment data structure indicating transcription words paired to image words by backtracing through the nodes included in the path from the final node to the first node using the node identification information.

8. The method of operating a machine of claim 7 wherein the similarity measurement indicated by the score for a transition is a function of image word lengths of the zero or more image words and of the zero or more transcription words associated with the transition.

9. The method of operating a machine of claim 1 wherein each image word in the ordered image word sequence is represented as an image word location defined according to an image coordinate system describing the text image;

each transcription word in the ordered transcription word sequence is represented as a transcription word location in the ordered label sequence of the transcription labels included in the transcription data structure; and transcription words aligned with image words are represented in the image-transcription alignment data structure as transcription word locations in the transcription and as image word locations in the text image, respectively.

10. A method of operating a machine to label image locations of image regions in a text image with label data may prove advantageous in some situations to intentionally over-segment the image words. That is, by biasing the image analysis toward finding image word boundaries wherever possible, it will be very likely that at least all the true image word boundaries will be found. The additional false image word boundaries that will also probably be found will be detected as false segmentations when the dynamic programming operation is implemented as just described using equations (7) or (8) and so will not be substantially harmful to the ultimate alignment result. Such a bias may well improve the overall alignment by preventing substantial errors in image regions where it would otherwise be difficult to find the true word boundaries. It is noted, however, that over-segmentation may not be appropriate in all circumstances, and that there may be some circumstances in which it may prove advantageous to intentionally under-segment the image words instead.

E. The machine environment

FIG. 13 shows the components of processor-controlled machine 100 implementing the features described above for aligning a text image and a transcription associated with the image. Machine 100 includes processor 140, which could be any processor, including one or more CPUs, and may include specialized hardware such as one or more coprocessors to provide specific functions. Processor 140 is connected for receiving image definition data defining images from image input circuitry 152. Input circuitry 152 is connected for receiving signals indicating image data from an image signal source 154. Image signal source 154 may include an optical scanner, a copier machine scanner, a Braille reading machine scanner, a bitmap workstation, or any similar signal source capable of providing image signals of the type required by the present invention. In the case of one of the scanners, the output of a sensor associated with the scanner is digitized to produce an image definition data structure defining an input image, and the image definition data structure is then provided to processor 140 via image input circuitry 152 for storage in data memory 114.

Processor 140 is also connected for receiving signals from input circuitry 158 connected to signal source 156 that provides signals indicating transcription data structure 60 (FIG. 4) to machine 100. Signal source 156 may include any signal-producing source that produces signals of the type needed by the present invention. Such sources include input devices controllable by a human user that produce signals in response to actions by the user, such as a keyboard device. Alternatively, signal source 156 may be an operation (not shown) that processor 140 is executing, or that is being executed by another processor in communication with processor 140, that provides transcription data structure 60 to processor 140 for processing according to the present invention. An example of such an operation is a character recognition operation performed on text image 10 that produces transcription data structure 60 as its output. Processor 140 then provides transcription data structure 60 to data memory 114 for storage.

Processor 140 is also connected for accessing program memory 110 and data memory 114 to obtain data stored therein. Processor 140 of machine 100 operates by accessing program memory 110 to retrieve instructions, which it then executes. Program memory 110 includes the underlying system software and firmware 112 that provide the operating system and operating facilities of machine 100, and image-transcription alignment routine 200 that implements the invention described in the flowchart of FIG. 9. Depending on the particular implementation of image-transcription alignment routine 200, program memory 110 may also include image word parameter analysis subroutine 210, transcription word parameter analysis subroutine 220 and alignment subroutine 240. During execution of the instructions in program memory 110, processor 140 accesses data memory 114 to obtain data items in transcription data structure 60 and text image 10, and to write image word parameter data 20, transcription word parameter data 80 and image-transcription alignment data 90 to memory 114. Data memory 114 also stores other data, such as the data structure for implementing alignment lattice 300 of FIG. 10. Miscellaneous data 122 includes other data used in executing instructions in program memory 110, and may include initial values, indexes for use in accessing the various data structures and the data structure used to store the alignment scores.

The actual manner in which the physical components of machine 100 are connected may vary, and may include hardwired physical connections between some or all of the components as well as connections over wired or wireless communications facilities, such as through remote or local communications networks and infrared and radio connections. Image signal source 154 and image input circuitry 152, for example, may be physically included in a single physical unit such as a scanning device that is part of a device such as a facsimile machine, that produces text image 10 and transmits it for receipt by processor 140. Or, either or both memory 110 or 114 may include memory that is physically connected to processor 140 as local memory, or that is remotely accessible to processor 140 by means of a wired or wireless communications facility. It is further of importance to note that the range of the physical size of machine 100, or of any of its components, may vary considerably from a large device, for example, a multi-featured high volume copier/duplicator device, to much smaller desktop, laptop, and pocket-sized or smaller display devices. The image-transcription alignment technique of the present invention is operable on all machines in this physical size range.

While this invention has been described in conjunction with a specific embodiment thereof, it is evident that many alternatives, modifications and variations will be apparent to those skilled in the art. Accordingly, the invention as herein described is intended to embrace all such alternatives, modifications and variations as fall within the scope of the appended claims.

What is claimed:

1. A method of operating a machine to align image words in a text image to transcription words in a transcription associated with the text image; the machine including a processor and a memory device for storing data; the data stored in the memory device including instruction data the processor executes to operate the machine; the processor being connected to the memory device for accessing the data stored therein; the method comprising:

operating the processor to obtain an image definition data structure defining a text image including a plurality of glyphs representing characters in an image character set;

operating the processor to obtain a transcription data structure associated with the text image and including a plurality of transcription labels indicating character codes representing characters in the image character set;

operating the processor to produce an ordered image word sequence of image words occurring in the text image; each image word being an image region in the text image including at least one glyph;

operating the processor to perform an alignment operation to align transcription word lengths in the ordered transcription word sequence with image word lengths in the ordered image word sequence; the alignment operation maintaining the ordered image word sequence and the ordered transcription word sequence when aligning the image word lengths and the transcription word lengths; the alignment operation producing a list of word pairs indicating transcription words in the ordered transcription word sequence paired to matching image words in the ordered image word sequence; and operating the processor to produce an image-transcription alignment data structure using the list of word pairs, the image word locations and the transcription word locations; the image-transcription alignment data structure indicating, for each word pair, the transcription word location of a transcription word and the image word location of a paired image word.

14. The method of operating a machine of claim 13 wherein, when the 2D text image includes a first image word and the transcription dam structure, when visually inspected and compared with the 2D text image, does not include transcription labels visually paired with the first image word thereby indicating a missing transcription word, the alignment operation detects the missing transcription word; the alignment operation further producing missing word data indicating that the first image word is not paired with a transcription word; the image-transcription alignment data structure using the missing word data to indicate that an image word location of the first image word is paired with no transcription word location of a transcription word.

15. The method of operating a machine of claim 13 wherein the alignment operation is implemented as a dynamic programming operation that represents the ordered transcription word sequence and the ordered image word sequence as a two-dimensional lattice data structure, hereafter referred to as a lattice, including a plurality of nodes and transitions between nodes; a transition between two nodes representing a pair of sequences of zero or more image words in the ordered image word sequence and zero or more transcription words in the ordered transcription word sequence; the dynamic programming operation producing a path through the nodes in the lattice from a first node to a final node using scores computed for nodes and computed for transitions between nodes in the lattice; a score for a transition indicating a similarity measurement between the zero or more transcription words and the zero or more image words associated with the transition; the dynamic programming operation storing node identification information for each node and transition in the path, as the path through the lattice is produced; and the alignment operation produces the image-transcription alignment data structure indicating the list of word pairs by backtracing through the nodes included in the path from the final node to the first node using the node identification information.

* * * * *